United States Patent
Binkert et al.

(10) Patent No.: US 8,938,169 B2
(45) Date of Patent: Jan. 20, 2015

(54) PRIORITIZED OPTICAL ARBITRATION SYSTEMS AND METHODS

(75) Inventors: Nathan Lorenzo Binkert, Redwood City, CA (US); Moray McLaren, Bristol (GB); Alan Lynn Davis, Coalville, UT (US)

(73) Assignee: Hewlett-Packard Development Company L. P., Houston, TX (US)

( * ) Notice: Subject to any disclaimer, the term of this patent is extended or adjusted under 35 U.S.C. 154(b) by 482 days.

(21) Appl. No.: 13/126,747

(22) PCT Filed: Oct. 31, 2008

(86) PCT No.: PCT/US2008/012392
§ 371 (c)(1),
(2), (4) Date: Apr. 28, 2011

(87) PCT Pub. No.: WO2010/050921
PCT Pub. Date: May 6, 2010

(65) Prior Publication Data
US 2011/0206377 A1    Aug. 25, 2011

(51) Int. Cl.
*H04J 14/02*    (2006.01)
*H04L 12/40*    (2006.01)

(52) U.S. Cl.
CPC .... *H04L 12/40156* (2013.01); *H04L 12/40163* (2013.01)
USPC .......................................................... 398/79

(58) Field of Classification Search
CPC .. H04J 14/02; H04B 10/07957; H04B 10/506
USPC .................................................. 398/79, 142
See application file for complete search history.

(56) References Cited

U.S. PATENT DOCUMENTS 4,089,584 A * 5/1978 Polczynski ...................... 385/24
5,369,515 A * 11/1994 Majima ............................ 398/59

(Continued)

FOREIGN PATENT DOCUMENTS

JP    1992-117042    4/1992

OTHER PUBLICATIONS

Dana Vantrease et al., "Corona: System Implications of Emerging Nanophotonic Technology" In Proceedings of the 35th International Symposium on Computer Architecture (ISCA-35). Beijing. China. Jun. 2008.

(Continued)

*Primary Examiner* — David Payne
*Assistant Examiner* — Tanya Motsinger
(74) *Attorney, Agent, or Firm* — Mannava Kangb P.C.; Ashok Mannava

(57) ABSTRACT

Various embodiments of the present invention relate to systems and methods for achieving low-latency, prioritized, distributed optical-base arbitration. In one embodiment, an optical arbitration system (100,1100) comprises a waveguide (102,1102) having a first end and a second end, and a source (104,1104) optically coupled to the first end of the waveguide and configured to input at least one wavelength of light into the waveguide. The system also includes a number of wavelength selective elements (106-109,1106-1109) optically coupled to the waveguide. Each wavelength selective element is capable of extracting a wavelength of light from the waveguide when activated by an electronically coupled node. An arbiter (110,116,120,1112,1116,1120) is optically coupled to the second end of the waveguide and to the waveguide between the source and a wavelength selective element located closest to the source along the waveguide.

13 Claims, 21 Drawing Sheets

(56) References Cited

U.S. PATENT DOCUMENTS

| | | | |
|---|---|---|---|
| 5,502,587 A * | 3/1996 | Frigo | 398/58 |
| 5,506,712 A * | 4/1996 | Sasayama et al. | 398/47 |
| 5,850,301 A * | 12/1998 | Mizuochi et al. | 398/79 |
| 5,861,967 A | 1/1999 | Mizuovhi et al. | |
| 6,032,185 A * | 2/2000 | Asano | 709/227 |
| 6,441,933 B1 * | 8/2002 | Jang | 398/79 |
| 8,032,020 B2 * | 10/2011 | Bartolini | 398/9 |
| 8,391,714 B2 * | 3/2013 | Binkert et al. | 398/66 |
| 2002/0076143 A1 * | 6/2002 | Foltzer | 385/24 |
| 2002/0135839 A1 * | 9/2002 | Aono | 359/127 |
| 2004/0175179 A1 * | 9/2004 | Xiao et al. | 398/83 |
| 2006/0115210 A1 * | 6/2006 | Nakagawa | 385/24 |
| 2006/0133717 A1 * | 6/2006 | Joyner et al. | 385/14 |
| 2006/0147205 A1 * | 7/2006 | Raddatz | 398/30 |
| 2006/0159392 A1 * | 7/2006 | Popovic | 385/27 |
| 2006/0171717 A1 * | 8/2006 | Kikuchi | 398/83 |
| 2006/0222366 A1 * | 10/2006 | Sugaya | 398/79 |
| 2007/0172240 A1 * | 7/2007 | Terai et al. | 398/83 |
| 2008/0253767 A1 * | 10/2008 | Galli et al. | 398/45 |
| 2009/0273842 A1 * | 11/2009 | Socci et al. | 359/577 |
| 2010/0189441 A1 * | 7/2010 | Bolla et al. | 398/79 |
| 2011/0081146 A1 * | 4/2011 | Nakajima et al. | 398/48 |

OTHER PUBLICATIONS

International Search Report, PCT/US2008/012392, Jul. 31, 2009, 11 pages.

R.G. Beausoleil et al., "A Nanophotonic Interconnect for High-Performance Many-Core Computation", IEEE Leos Newsletter, Jun. 2008.

Wen-Yu Tseng et al., "A combinational media access protocol for multicast traffic in single-hop WDM LANs", IEEE GLOBECOM 98, Nov. 8, 1998-Nov. 12, 1998. See p. 296 C The Arbitration Procedure and the Control Channel Access.

* cited by examiner

Table A
Round of Arbitration
Request phase

| Arbiter | | Resonators On | Detector values | Resonators On | Detector values |
|---|---|---|---|---|---|
| PL1 | | . | 0 | | 0 |
| PL2 | | . | 0 | PL2 | 0 |
| PL3 | | . | 0 | PL3 | 0 |
| PL4 | | . | 0 | PL4 | 0 |

↑ 201 ↑ 206 ↑ 202 ↑ 209

Table B
Round of Arbitration
Request phase

| NODE | Priority Request | Resonators On | Detector values | Resonators On | Detector values |
|---|---|---|---|---|---|
| N0 | | | | | |
| N1 | PL4 | N1.PL4 | 1 | N1.PL4 | PL2 |
| N2 | | | . | | |
| N3 | PL2 | N3.PL2 | 1 | N3.PL2 | 0 |
| N4 | PL3 | N4.PL3 | 1 | N4.PL3 | 0 |
| N5 | PL3 | N5.PL3 | 0 | N5.PL3 | 0 |
| N6 | PL1 | N6.PL1 | 1 | N6.PL1 | 1 |
| N7 | PL4 | N7.PL4 | 0 | N7.PL4 | 0 |

PRIORITIZED OPTICAL ARBITRATION SYSTEMS AND METHODS

TECHNICAL FIELD

Embodiments of the present invention relate generally to arbitration of concurrent requests for access to shared computer resources.

BACKGROUND

Modern distributed computer systems are typically composed of a number of independently operating nodes. A node can be a processor, memory, a circuit board, a server, a storage server, a core or a multicore processor, an external network connection or any other data processing, storing, or transmitting device. It is often the case that these independently operating nodes need access to the same resource. For example, two nodes may need to use an output port of another node for transmitting information or need to use a shared resource such as a shared communication bus. Without coordination, these two nodes may begin to simultaneously use the resource. It may be the case that the information sent by one or both of the nodes is lost or corrupted upon arrival at the resource. Thus, computer systems often employ a conflict resolution scheme called "arbitration" in order to prevent two or more nodes from simultaneously using the same resource. Arbitration ensures that only one node at a time uses the resource.

In many cases, arbitration lies on the critical path of computer system performance since arbitration inherently sequences two or more otherwise independent parallel activities. The nodes requesting access to a resource can be physically distributed. A typical arbitration scheme involves communication to gather all the "requests" for the resource, a centralized or distributed computation to select or "grant" one of the requests, and then an additional communication is needed to distribute the "grant" to the node which has won the arbitration.

The most critical property of any arbitration mechanism is the ability to grant access to at most one requesting node at any given time. This arbitration property is typically called "mutual exclusion." Fairness is another property that is necessary to make an arbitration mechanism useful in practice. In general, fairness implies that competing requests will win arbitration with equal probability given a sufficiently large enough sample of competing nodes. While this general interpretation of fairness is often considered ideal, it is often expensive to achieve in practice. This is particularly true for distributed arbitration schemes where the overhead incurred to achieve this general notion of fairness often results in reduced performance and increased cost. The overhead problem becomes particularly impractical if cost and performance become significantly worse as the system size increases. This "scaling" issue is particularly important for arbitration mechanisms which are intended for use in systems comprising a large number of nodes.

It is possible to relax this general notion of arbitration fairness to a policy in order to provide "starvation free" arbitration. When arbitration is starvation free, it guarantees that any requesting node will eventually win the arbitration. While starvation free arbitration usually incurs less overhead and has improved scaling properties when compared to truly fair arbitration, it is problematic in that it inherently treats all requests at any given point in time as having equal priority. In general, overall system performance is degraded significantly if certain requests are delayed to the point where ungranted requests become performance bottlenecks. In any system, some requests have higher priority than others. Priority based arbitration implies that higher priority requests will be granted prior to lower priority requests. In priority based schemes, each new request is assigned an initial priority based on some importance metric. An additional option is to allow priorities to be increased based on how long they have been waiting to win arbitration access to a particular resource. This "age based arbitration priority" can be coupled with starvation free arbitration at each priority level to achieve an arbitration policy with reasonable fairness, scaling, and cost properties.

Any correct arbitration mechanism must be capable of guaranteeing mutually exclusive access to a shared resource, and must do so in a way that is starvation free. Other desirable properties of an arbitration mechanism include scalability in terms of cost and performance. The key to cost scalability is minimizing the physical resources, such as energy, wires, waveguides, and transistors, required to implement the arbitration policy, and the key to performance scalability is the need to reduce the latency of an individual arbitration decision as much as possible. Engineers and computer scientists continue to develop lower latency arbitration systems and methods to increase system performance.

SUMMARY

Various embodiments of the present invention relate to systems and methods for achieving low-latency, prioritized, distributed optical-base arbitration. In one embodiment, an optical arbitration system comprises a waveguide having a first end and a second end, and a source optically coupled to the first end of the waveguide and configured to input at least one wavelength of light into the waveguide. The system also includes a number of wavelength selective elements optically coupled to the waveguide. Each wavelength selective element is capable of extracting a wavelength of light from the waveguide when activated by an electronically coupled node. An arbiter is optically couple to the second end of the waveguide and to the waveguide between the source and a wavelength selective element located closest to the source along the waveguide. Prioritized arbitration can be carried out by assigning each wavelength a particular priority level or by assigning a priority level to each time slot in which a portion of the at least one wavelength can be extract from the waveguide.

BRIEF DESCRIPTION OF THE DRAWINGS

FIG. 2 shows tables representing the behavior of wavelength selective elements during an exemplary round of arbitration performed on an optical arbitration system in accordance with embodiments of the present invention.

DETAILED DESCRIPTION

Various embodiments relate to systems and methods for achieving low-latency, prioritized, distributed arbitration. The arbitration systems and methods are optical based, whereby different priority levels for accessing to a shared resource are associated with particular wavelengths of light or a single wavelength of light transmitted in a particular time slot. The term "light" refers to electromagnetic radiation having wavelengths within the visible and non-visible portions of the electromagnetic spectrum, such as the ultraviolet and infrared portions of the spectrum. Separate wavelength prioritized arbitration system and method embodiments are described below in a first subsection and time-division multiplexed prioritized arbitration system and method embodiments are described below in a second subsection.

Figure 1:
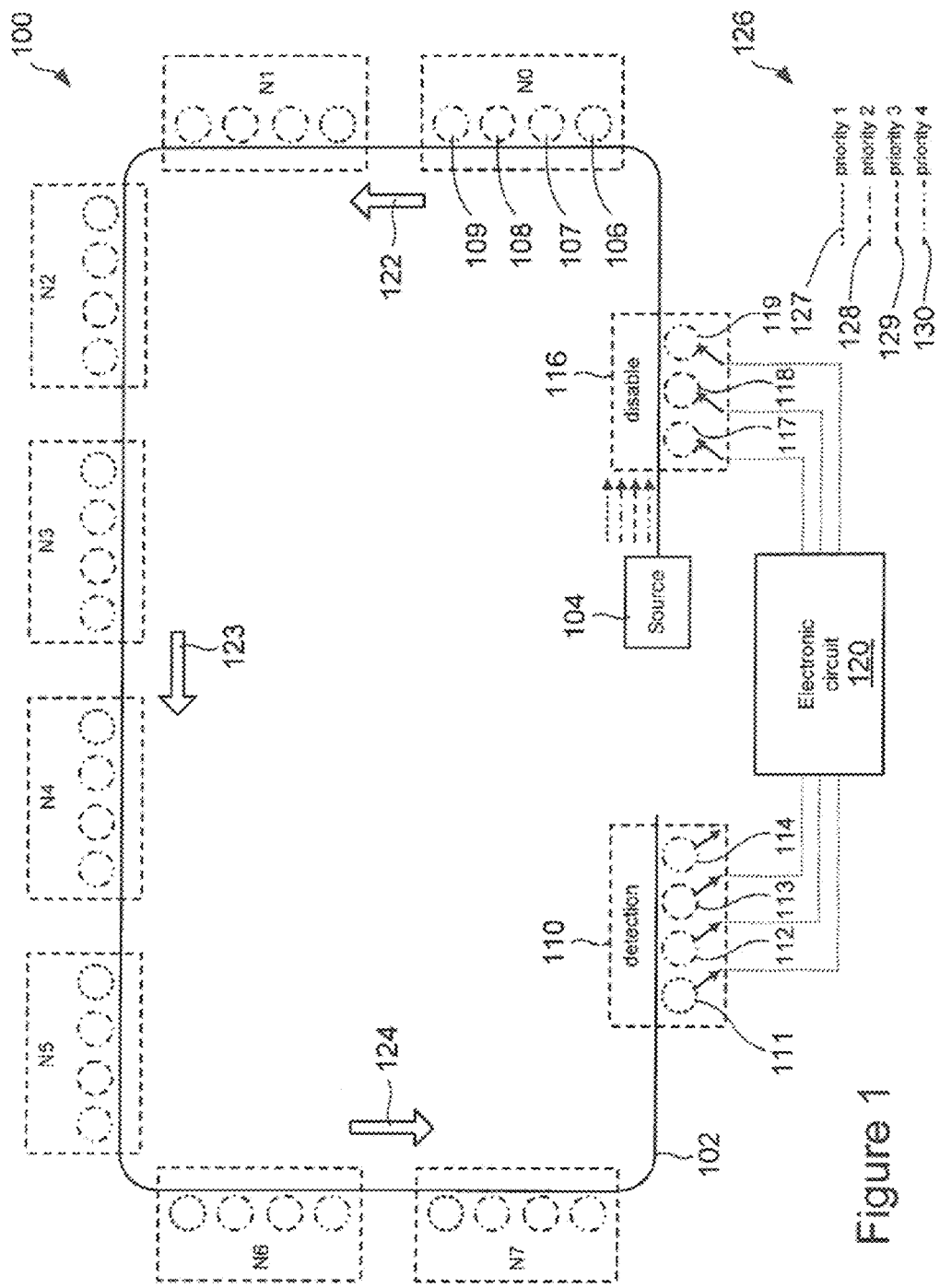
FIG. 1 shows a schematic representation of a first prioritized optical arbitration system configured in accordance with embodiments of the present invention.

I. Systems and Methods for Performing Prioritized Optical Arbitration Using Wavelength-division Multiplexing A. An Optical Arbitration System FIG. 1 shows a schematic representation of a first optical arbitration system 100 configured in accordance with embodiments of the present invention. The system 100 includes a waveguide 102, an optical power source 104 optically coupled to a first end of the waveguide 102, and 8 substantially identical sets of four wavelength selective elements represented by circles, such as circles 106-109. Each set of wavelength selective elements is optically coupled to the waveguide 102 and electronically coupled to one of 8 nodes labeled N0 through N7. The system 100 also includes an arbiter comprising a detection element 110 and a disable element 116. The detection elements 110 comprises four detecting wavelength selective elements 111-114 disposed near a second end of the waveguide 102, and the disable element 116 comprises three disabling wavelength selective elements 117-119 optically coupled to the waveguide 102 between the source 104 and node N0. The arbiter also includes an electronic circuit 120 that is electronically coupled to the detecting wavelength selective elements 111-114 and the disabling wavelength selective elements 117-119.

As shown in the example of FIG. 1, light comprising four distinguishable, unmodulated wavelengths, each wavelength represented by a differently patterned directional arrow, is output from the optical power source 104 and injected into the waveguide 102. The light travels in a counter-clockwise manner along the waveguide 102, as indicated by directional arrows 122-124, passing the disable element 116, each set of wavelength selective element, and finally the detection element 110. Each wavelength represents a particular priority level associated with the use of a resource, such as a bus waveguide, a port, or any other shared resource that only one node can use at a time. FIG. 1 and subsequent figures include a legend 126 displaying four line patterns. Each line pattern represents a wavelength of light output from the source 104 and each wavelength is associated with a particular priority level. Dotted line pattern 127 represents a wavelength of light having the highest priority level 1, dot-dashed line pattern 128 represents a wavelength of light having the second highest priority level 2, dashed line pattern 129 represents a wavelength having the third highest priority level 3, and double-dot dashed line pattern 130 represents a wavelength having the lowest priority level 4.

The waveguide 102 can be a ridge waveguide, a photonic crystal waveguide, or an optical fiber. Examples of wavelength selective elements are microring resonators, photonic crystal resonators, or any other device configured to have resonance with light of a particular wavelength traveling in the adjacent waveguide 102. The resonators are disposed adjacent to the waveguide 102. This resonance enables a resonator to extract light of a particular wavelength from the waveguide 102 via evanescent coupling. In the interest of brevity, the node, disabling, and detecting resonators are hereinafter referred to as "node resonators," "disabling resonators," and "detecting resonators," respectively. A more detailed description of the operation of mirroring resonators is provided below in the subsection "Mirroring Resonators."

The node resonators and the disabling resonators are electronically tunable, and each node resonator and each disabling resonator is configured to have resonance with one of the 4 wavelengths output from the source 104 when an appropriate voltage is applied, in which case the node resonator or disabling resonator is said to be "active." As shown in FIG. 1, each node and disabling resonator is illustrated with a particular line pattern in order to identify the wavelength that each resonator has resonance with when active. For example, node resonator 106 has resonance with the wavelength 127 when active, and node resonator 107 has resonance with the wavelength 128 when active. When a tunable resonator is active, it extracts and traps light of an associated wavelength from the waveguide 102 via evanescent coupling. In certain embodiments, the node resonators, unlike disabling resonators, can be configured to convert at least a portion of the trapped light into an electronic signal that is transmitted to an electronically coupled node which interprets the electronic signal to indicate that the wavelength is removed from the waveguide 102. In other embodiments, the light extracted by an activated node resonator is coupled into a separate waveguide that carries the light to a detector. In general, the light trapped in a resonator ultimately decays and leaks out via losses. While a resonator is active, the intensity or amplitude of the resonant wavelength carried by the waveguide 102 drops sharply to approximately zero. When the voltage is no longer applied, the resonance wavelength of the resonator shifts away from the wavelength of the light, the intensity or amplitude of the wavelength is restored, and the wavelength propagates undisturbed along the waveguide 102. When no voltage is applied to a tunable resonator, the resonator is said to be "inactive."

Unlike the node resonators and disabling resonators, the detecting resonators 111-114 of the detection element 110 are configured to be in a permanently active or resonant state. In other words, the detecting resonators 111-114 are not electronically tunable, and each detecting resonator is configured to have at least partial resonance with one of the wavelengths 127-130. As shown in FIG. 1, each detecting resonator in the detection element 106 is also represented by a line pattern corresponding to one of the wavelengths 127-130 in order to identify the wavelength each detecting resonator has at least partial resonance with. Thus, each detecting resonator extracts at least a portion of the light of a corresponding wavelength from the waveguide 102 via evanescent coupling. When light is trapped within a detecting resonator, the detecting resonator generates a relatively high electronic signal that is transmitted along an electronically connected signal line to the electronic circuit 120. When light is not trapped within a detecting resonator, the detecting resonator can transmit either a relatively low electronic signal to the electronic circuit 120 or transmit no electronic signal to the electronic circuit 120. The electronic circuit 120 receives the electronic signals from the detecting resonators 111-114 and determines which priority levels should be disabled and activates the appropriate disabling resonators 117-119 as described below.

B. Wavelength-division Multiplexed Arbitration

Arbitration is carried out on the system 100 in successive rounds. Each round of arbitration includes (1) a request phase followed by (2) a grant phase. During the request phase the disabling resonators are inactive allowing the nodes participating in the round of arbitration to extract a wavelength associated with the priority level selected by the participating nodes. The detecting resonators 111-114 communicate to the electronic circuit 120 which priority levels have been selected by the nodes during the request phase. At the beginning of the grant phase, the electronic circuit 120 responds to the signals sent from the detecting resonators 111-114 by activating appropriate disabling resonators of the disable element 116 to remove the wavelengths associated with priority levels that are lower than the highest priority level selected by one of the nodes. As a result, the node located closest to the source 104 that successfully extracted the wavelength associated with the highest priority level during the request phase is granted access to the resource during the successive grant phase. During the grant phase, a requesting node that detects the wavelength associated with the priority level of its request is aware that it has won the round of arbitration and can be begin using the resource for a period of time. Also during the grant phase, the nodes not detecting the wavelength associated with the priority level they selected during the request phase are aware that they have lost the round of arbitration and must wait for a subsequent round of arbitration.

FIG. 2 shows Tables A and B representing the behavior of the resonators during an exemplary round of arbitration performed on the optical arbitration system 100 in accordance with embodiments of the present invention. In particular, Table A represents the behavior of the detecting resonators 111-114 and disabling resonators 117-119 of the system 100 during a round of arbitration, and Table B represents the behavior of the node resonators of the system 100 during the same round of arbitration. The entries corresponding to the priority levels 1-4 are represented by PLn, where n equals 1, 2, 3, or 4. In the following description reference is made to FIGS. 3A-3B which show the arbitration system 100 during a request phase and a grant phase, respectively, for the round of arbitration represented in Tables A and B in accordance with embodiments of the present invention.

In Table A, columns 201 and 202 display the priority levels or wavelengths removed from the waveguide 102 during the request and grant phases. At the beginning of the round of arbitration, the entries in column 201 are empty indicating that the disabling resonators 117-119 are inactive and the wavelengths associated with the priority levels 1-4 enter the waveguide 102. Each node asserting a request activates the resonator corresponding to the wavelength associated with the priority level selected by the nodes. In Table B, column 203 represents the priority levels selected by the nodes at the beginning of the round of arbitration, and column 204 represents the wavelengths associated with the priority levels each node attempts to extract during the request phase. For example, column 203 reveals that node N1 selected priority level 4, and column 204 reveals that node N1 activated the node resonator corresponding to the wavelength associated with priority level 4. Resonators remain active for the entire round of arbitration.

Figure 3A:
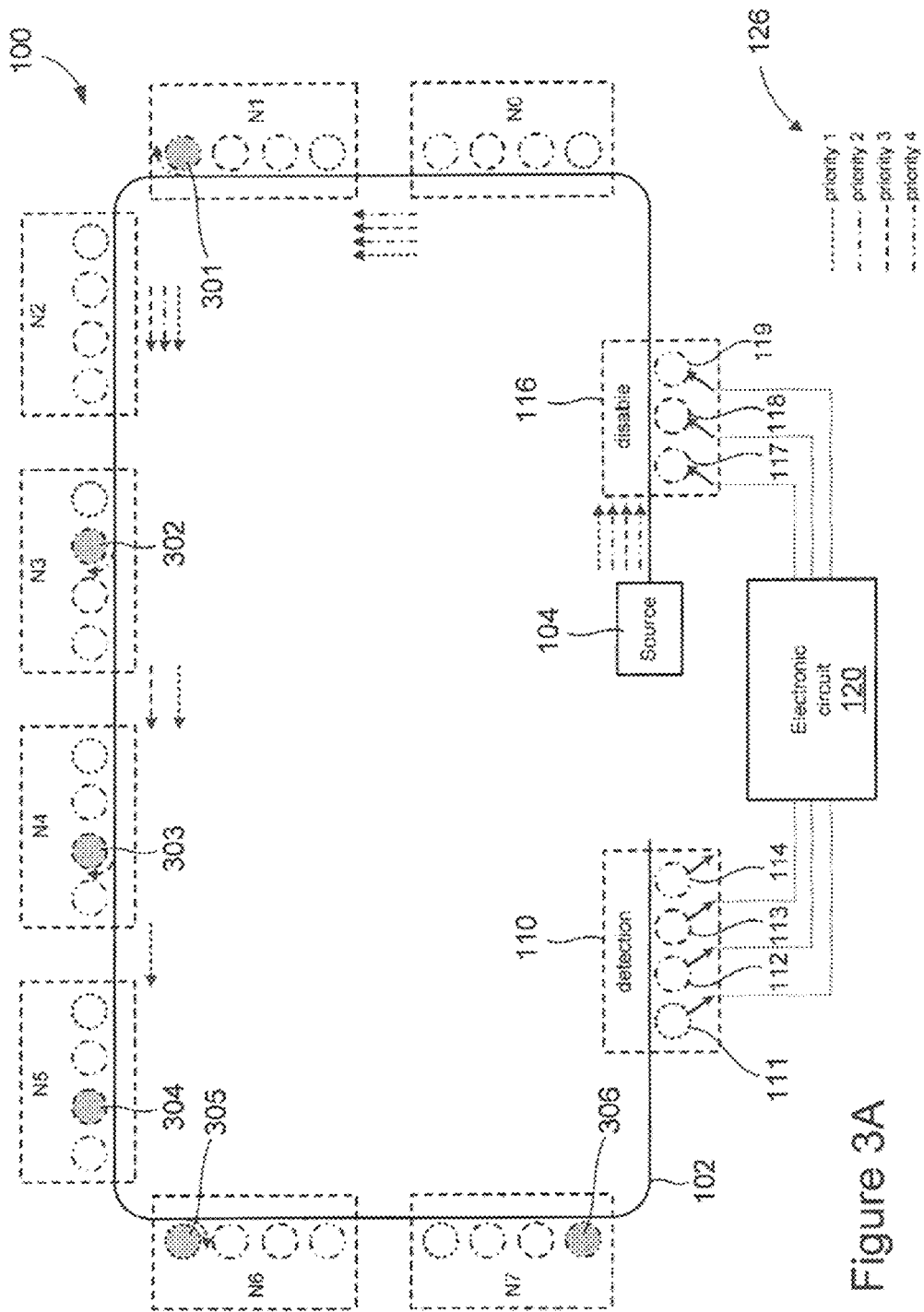
FIGS. 3A-3B show the arbitration system shown in FIG. 1 during a request phase and a grant phase, respectively, of a round of arbitration in accordance with embodiments of the present invention.

As shown in FIG. 3A, active resonators are shaded and an inactive resonator is unshaded. Active resonators 301-306 correspond to the priority levels represented in column 204 of Table B shown in FIG. 2. As shown in the example of FIG. 3A, the four active resonators 301-303 and 305 extract the wavelengths corresponding to the priority levels 1-4 from the waveguide 102 as the wavelengths pass nodes N1-N3 and N6. Nodes N5 and N7 activated resonators corresponding to the same priority levels as nodes N4 and N1, respectively, however, because nodes N1 and N4 are located closer to the source 104 along the waveguide 102, nodes N1 and N4 extract the wavelengths before nodes N5 and N7.

Returning to FIG. 2, column 205 of Table B displays which nodes successfully extract and detect the wavelengths during the request phase, where a detector value "0" represents no detection and a detector value "1" represents detection. For example, in column 205 entries with a "1" reveal that nodes N1-N3 and N6 detected the wavelengths associated with priority levels selected by nodes N1-N3 and N6 and entries with a "0" reveal that nodes N5 and N7 did not detect the wavelengths associated with the priority levels they selected, as described above with reference to FIG. 3A. Because the wavelengths are completely extracted by the nodes N1-N3 and N6, column 206 of Table A reveals that at the end of the request phase, the detecting resonators 111-114 detect no light for each of the priority levels. For example, as shown in FIG. 3A, the wavelengths associated with priority levels 1-4 are extracted by active resonators 301-303 and 305 and none of the wavelengths reach the detecting resonators 111-114.

Figure 3B:
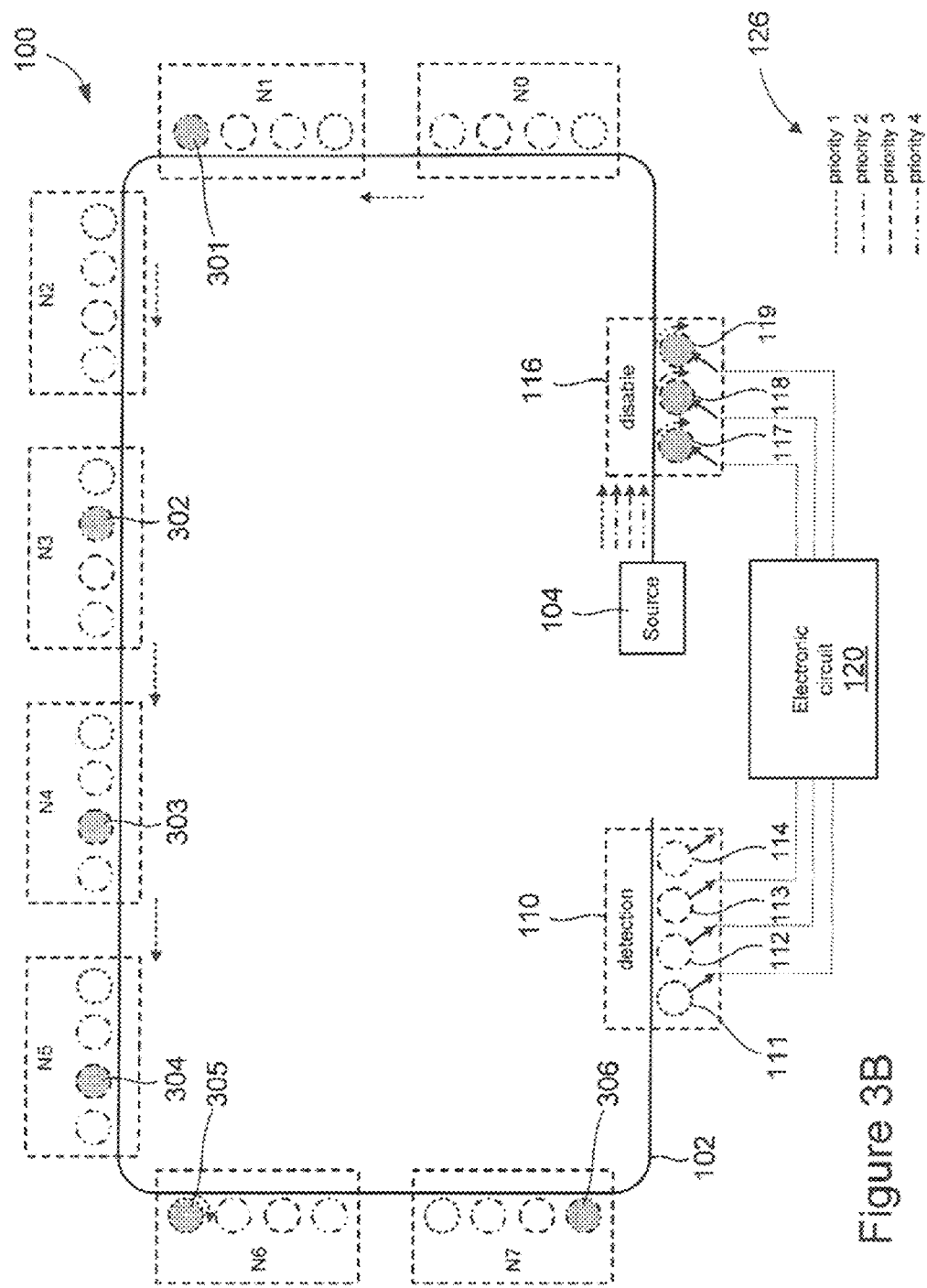

Because the wavelengths associated with the highest priority level was not detected at the end of the request phase by the detecting resonator 111, at the beginning of the grant phase, the electronic circuit 120 activates the disabling resonators 117-119 so that wavelengths other than the highest priority level are extracted from the waveguide 102. As shown in FIG. 3B, at the beginning of the grant phase, the electronic circuit 120 activates all three of the disabling resonators 117-119. As a result, the wavelengths corresponding to the priority levels 2-4 are extracted from the waveguide 102 leaving the wavelength corresponding to the highest priority level to travel along the waveguide 102 where it is extracted by node N6.

Returning to FIG. 2, column 207 of Table B reveals that resonators 301-306 remain active during the grant phase. The entries associated with the priority levels 2-4 in column 202 of Table A correspond to the waveguides extracted by the disabling resonators 117-119 during the grant phase, and column 208 has an entry of "1" for node N6, which corresponds to node N6 extracting the wavelength associated with the highest priority level and winning the round of arbitration, as described above with reference to FIG. 3B. The entries in column 209 are all "0" indicating that none of the wavelengths reach the detecting resonators 111-114 during the grant phase.

C. Combined Wavelength-division Multiplexed and Time-division Multiplexed Arbitration In many computational systems, the nodes may share more than one resource. For example, a number of nodes may need to access a bus waveguide and a number of nodes may also at about the same time need to access a shared output port. Thus, WDM-based arbitration methods can be expanded to include time-division multiplexed ("TDM") so that arbitration can be carried out for multiple resources with the same arbitration system 100. The is accomplished by time-division multiplexing separate request and grant phases within each round of arbitration, where each pair of request and grant phases are associated with determining access to a different shared resource.

Figure 4:
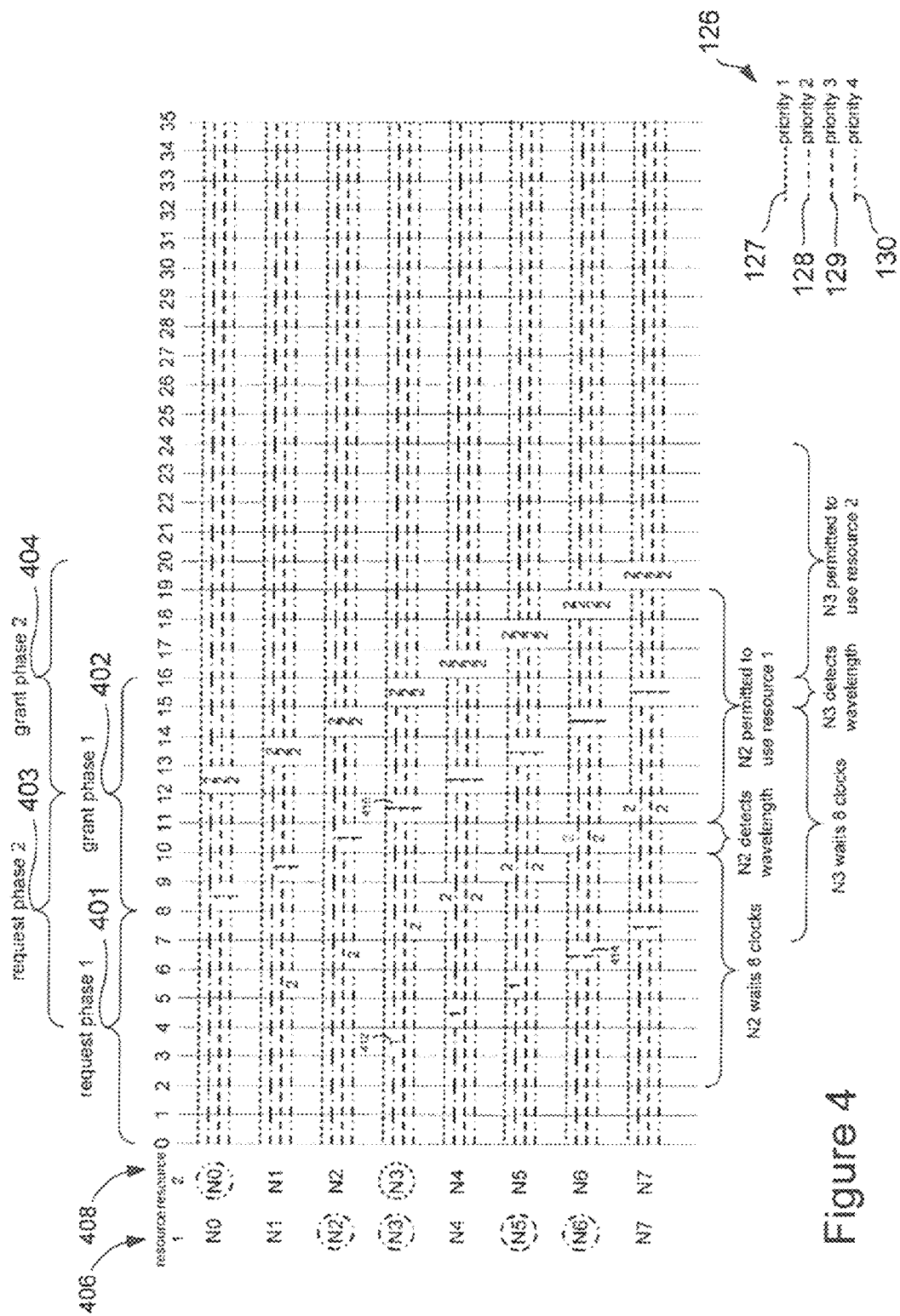
FIG. 4 shows a second exemplary timing diagram associated with arbitrating for two shared resources in accordance with embodiments of the present invention.

FIG. 4 shows a second exemplary timing diagram associated with arbitrating for two shared resources using the system 100 in accordance with embodiments of the present invention. A single round of arbitration includes a first request phase 401 immediately followed by a first grant phase 402 and a second request phase 403 immediately followed by a second grant phase 404. The first request phase 401 begins at time step 0, and the second request phase 403 begins at time step 4. A time step can be a clock edge of a clock signal or any other suitable delineation for discrete periods of time. Each request phase and grant phase spans eight time slots, where a time slot can be a single clock cycle, a fraction of a clock cycle, a number of clock cycles, or any other suitable period of time. Each time slot begins and ends on a time step represented by regularly spaced lines identified by an integers 0-35. Column 406 lists the priority request made by the nodes for the first resource, and column 408 lists the priority requests made by the same nodes for the second resource. Each node has a particular time slot within a request phase in which it can assert a request, and each node has a particular time slot within a grant phase in which it learns that its request is granted or denied. For example, node N0 is allowed to assert a request during the first request phase 401 for one time slot beginning at time step 0, and node N1 is allowed to assert a request for the same resource during the first request phase 401 for one time slot beginning at time step 1. In addition, node N0 is allowed to assert a request during the second request phase 403 for one time slot beginning at time step 4, node N1 is allowed to assert a request for the same resource during the first request phase 401 for one time slot beginning at time step 5. Table I displays nodes and corresponding time steps when a node can activate a resonator for one time slot to assert a request for two resources during the request phases 401 and 403.

TABLE I

| Node | Time step in request phase 1 | Time step in request phase 2 |
|---|---|---|
| N0 | 0 | 4 |
| N1 | 1 | 5 |
| N2 | 2 | 6 |
| N3 | 3 | 7 |
| N4 | 4 | 8 |
| N5 | 5 | 9 |
| N6 | 6 | 10 |
| N7 | 7 | 11 |

Each node that successfully asserts a request in one of the request phases 401 and 403 can determine whether or not that request has been granted during the corresponding first and second grant phases 402 and 404 by activating the resonator corresponding to the selected priority level for one time slot during the grant phases 402 and 404. Table II displays nodes and corresponding time steps when each node can activate a resonator in the respective grant phases 402 and 404.

TABLE II

| Node | Time step in grant phase 1 | Time step in grant phase 2 |
|---|---|---|
| N0 | 8 | 12 |
| N1 | 9 | 13 |
| N2 | 10 | 14 |
| N3 | 11 | 15 |
| N4 | 12 | 16 |
| N5 | 13 | 17 |
| N6 | 14 | 18 |
| N7 | 15 | 19 |

As shown in the example of FIG. 4, column 406 reveals that nodes N2, N3, and N6 have all selected the second priority level. Node N2 begins extracting the wavelength 128 at time step 2 leaving a one time slot gap 412 in the wavelength 128 travelling around the waveguide 102, and node N5 begins extracting the wavelength 129 at time step 5 leaving a one time slot gap 414 of in the wavelength 129. The gaps associated with the first request phase 401 are labeled 1. FIG. 4 reveals that gap 412 reaches nodes N3 at the beginning of time steps 3 and reaches node N6 at the beginning of time steps 6, which corresponds to the time steps when nodes N3 and N6 are allowed to assert a request for the priority level associated with the wavelength 128. Thus, nodes N3 and N6 fail to extract the wavelength 128 beginning at time steps 3 and 6, and as a result, nodes N3 and N6 have to wait for a later round of arbitration to assert another request for the first resource.

Figure 5A:
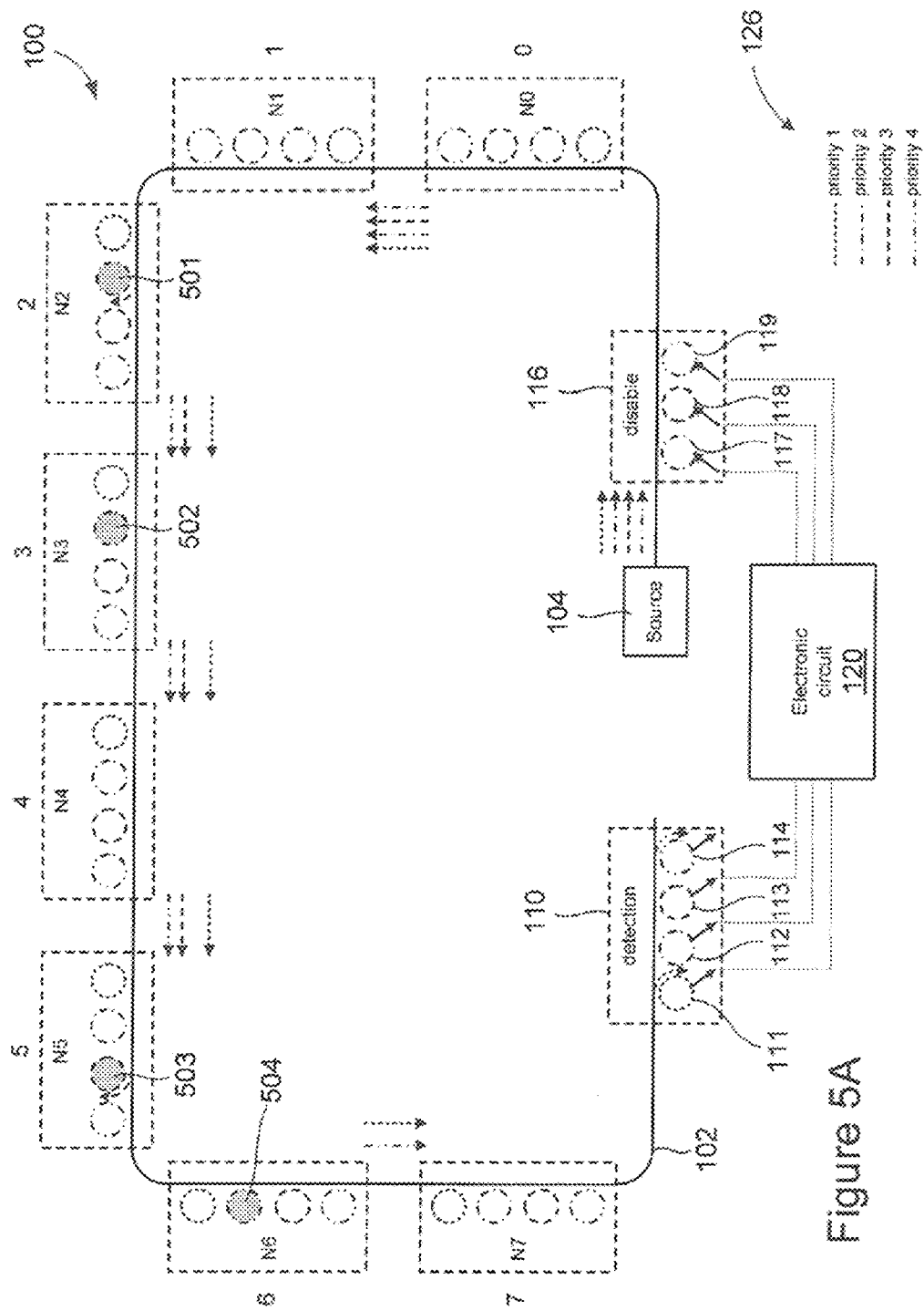
FIGS. 5A-5B show the arbitration system shown in FIG. 1 during a request phase and grant phase, respectively, in accordance with embodiments of the present invention.
Figure 5B:
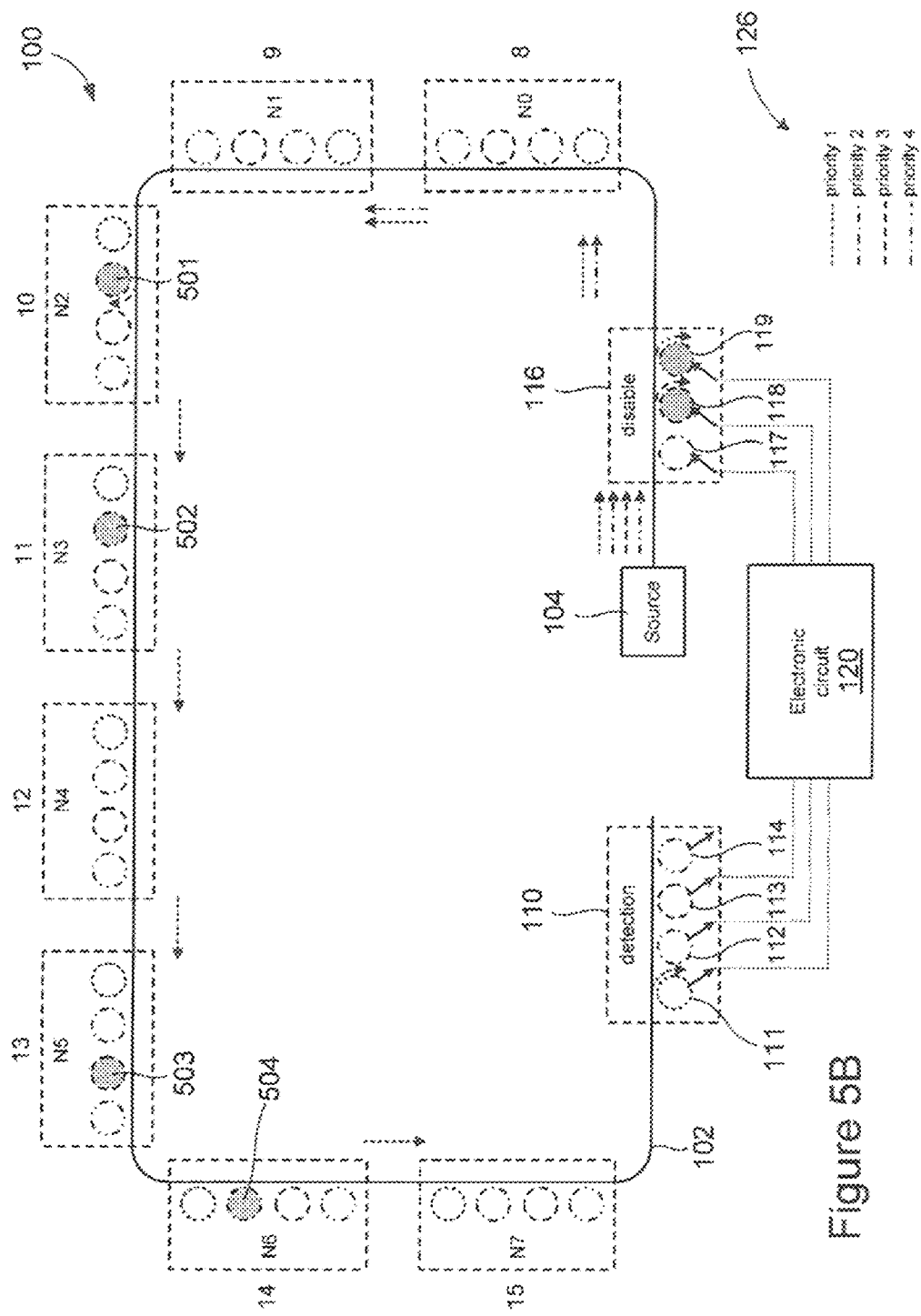

FIGS. 5A-5B show the arbitration system 100 during the request phase 401 and the grant phase 402, respectively, operated in accordance with embodiments of the present invention. Active resonators 501-504 correspond to the circled nodes in column 406 in FIG. 4. Integers located next to each node correlate with the time steps in the request and grant phases 401 and 402. As shown in the example of FIG. 5A, active resonator 501 extracts a corresponding wavelength from the waveguide 102 when activated at time step 2, which corresponds to the gap 412 in FIG. 4, and active resonator 503 extracts a corresponding wavelength from the waveguide 102 when activated at time step 5, which corresponds to the gap 418 in FIG. 4. The wavelengths 127 and 130 pass the sets of resonators undisturbed and are detected by the detecting resonators 111 and 114 during the time slot beginning at time step 7. The detecting resonator 111 sends an electronic signal to the electronic circuit 120. As shown in FIG. 5B, the electronic circuit 120 responds by activating the disabling resonators 118 and 119 for a period of one time slot. At the beginning of the grant phase 402, which begins at time slot 8 as shown in FIG. 4, the wavelengths 129 and 130 are extracted from the waveguide 102 leaving the wavelengths 127 and 128 to continue traveling along the waveguide 102 where the wavelength 128 is extracted by node N2 at time step 10.

Returning to FIG. 4, beginning with the first grant phase 402 at time slot 8, the wavelengths 129 and 130 are extracted from the waveguide 102 for one time slot leaving gaps 420 and 422 in wavelengths 129 and 130, as described above with reference to FIG. 5B. At the beginning of the time step 10, the node N2 extracts the wavelength 128 for one time slot leaving a one time slot gap 416 in the wavelength 128. Thus, node N2 is aware that it has been granted access to the first resource until the start of the first grant phase of the next round of arbitration and can be begin using the resource.

Meanwhile, column 408 reveals that node N0 selected the lowest priority level and node N3 selected the highest priority level. The gaps associated with the request 403 and grant phase 404 are labeled 2. The timing diagram reveals that node N3 is ultimately granted access to the second resource at time step 15.

D. Increasing Priority Levels

The arbitration methods described above with reference to FIGS. 2-5 favor nodes that lie closest to the optical power source 104. For example, suppose nodes N3 and N6 both select the same priority level at the beginning of the request phase. Provided no other node has selected a higher priority level, node N3 will be granted access and node N6 has to wait for a subsequent round of arbitration to assert another request. Embodiments of the present invention also allow nodes to increment or increase the priority level when they have either lost request or won a request but lost access during the grant phase. Increasing the priority level can be based on a class of service agreement, type of information to be transmitted, global age of information, length of time information has been stored at the node, present length of time before information expires, or any other criteria for determining an increase in the priority level. For example, suppose node N6 processes packets that are time stamped and must be sent before the packets expire. In certain embodiments, after each unsuccessful round of arbitration, node N6 can re-examine the time stamp on each packet and accordingly increase the priority level. In other embodiments, node N6 can increase the priority level immediately following an unsuccessful request phase or immediately following an unsuccessful grant phase.

E. Summary of Wavelength-division Multiplexed Arbitration

Figure 6:
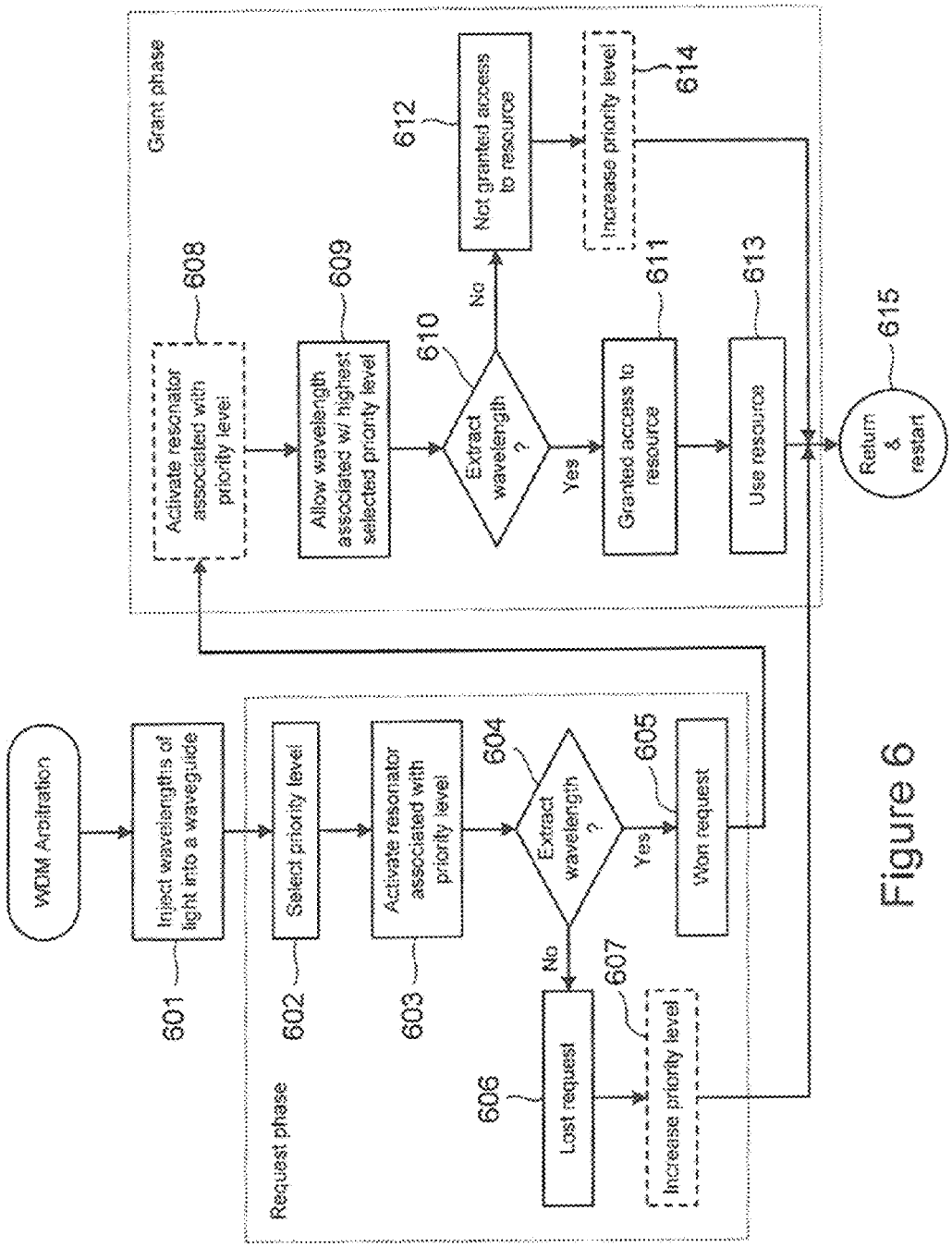
FIG. 6 shows a control-flow diagram representing steps associated with a method for prioritized wavelength-division multiplexed arbitration for a shared resource in accordance with embodiments of the present invention.

FIG. 6 shows a control-flow diagram representing steps associated with a method for performing prioritized WDM arbitration for a shared resource in accordance with embodiments of the present invention. As shown in FIG. 6, steps 602-607 are steps performed during a request phase, and steps 608-613 are performed during a grant phase. In step 601, light comprising a number of wavelengths is injected from an optical power source into a waveguide using wavelength-division multiplexing, as described above with reference to FIG. 1. Each wavelength of light is associated with a particular priority level. In step 602, the method enters the request phase, and nodes electing to participate in a round of arbitration each select a priority level for accessing to a shared resource. The nodes electing to participate have no knowledge of the priority levels selected by other participating nodes, and thus, each node independently selects a priority level. In step 603, the nodes electing to participate, activate a resonator corresponding to the wavelength of light associated with the selected priority level, as described above with reference to FIGS. 1, 3A, and 5A. In step 604, each node that extracts a selected wavelength of light proceeds to step 605, otherwise, each node that does not extract a wavelength of light proceeds to step 606. In step 606, nodes are aware that they lost their request, deactivate their resonators, and wait for a later round of arbitration to assert a new request for access to the resource. In optional step 607, a node that is unsuccessful in asserting a request can increment the priority level in order to increase the node's chances of success in a subsequent round of arbitration. For example, a node sending VoIP packets may increase to the highest priority level for a subsequent round of arbitration or a node can increment the priority level associated with certain packets that are time stamped and have to be sent before they expire. In step 605, the remaining participating nodes are aware that they won their request and proceed to the grant phase to determine whether their request is granted or denied. In optional step 608, the nodes that won their request to proceed to the grant phase can leave their resonators active, as described above with reference to FIGS. 4-5, or they can deactivate their resonators and reactivate their resonators during the grant phase, as described above with reference to FIGS. 2-3. In step 609, wavelengths associated with priority levels that are lower than the highest extracted priority level wavelength are removed from the waveguide, as described above with reference to FIGS. 3B and 5B. In step 610, when the node having selected the highest priority level that is located closest to the optical power source extracts the associated wavelength from the waveguide proceed to step 611, otherwise, the remaining nodes proceed to step 612. In step 611, the node is granted access to the resource, and in subsequent step 613, the node begins using the resource. In step 612, the remaining nodes are aware that they are not granted access to the resource and wait for a subsequent round of arbitration. In optional step 614, these nodes can increment their selected priority levels for subsequent rounds of arbitration. In step 615, the steps 601-613 are repeated for subsequent rounds of arbitration.

Figure 7A:
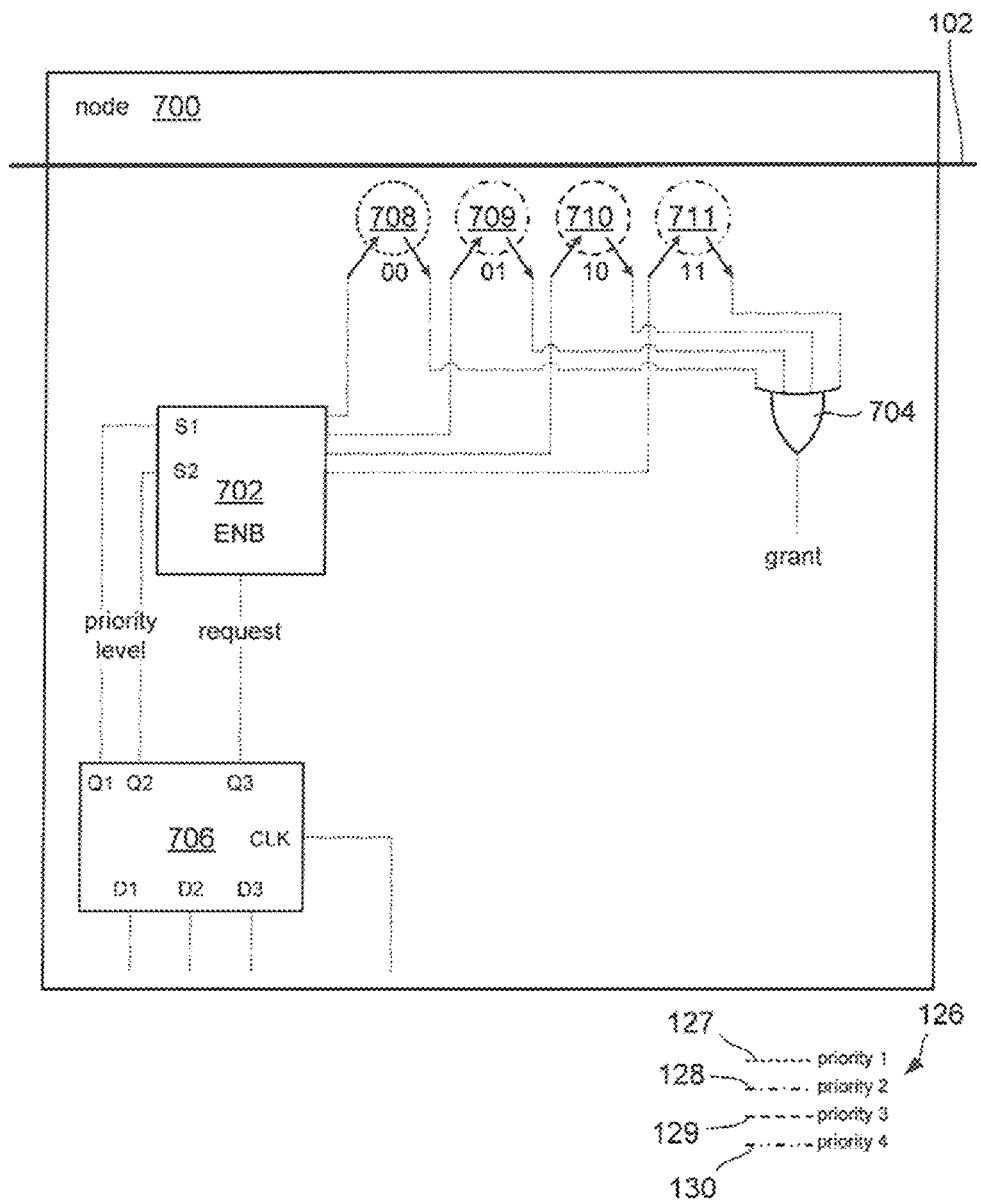
FIG. 7A shows a circuit diagram of electronic components of a node configured in accordance with embodiments of the present invention.

F. Schematic Circuit Diagrams of Nodes, the Electronic Circuit, and Other Optical Arbitration System Embodiments FIG. 7A shows a schematic circuit diagram of a node 700 configured in accordance with embodiments of the present invention. The node 700 represents the nodes of the optical arbitration system 100. The electronic components include an enablement circuit ("ENB") 702, an OR gate 704, and a request latch 706. The request latch 706 is electronically coupled to the ENB 702 which is electronically coupled to each of the resonators 708-711. The resonators 708-711 are each separately electronically coupled to the OR gate 704. Each resonator is assigned a 2-bit priority level corresponding to one of the four priority levels assigned to the wavelengths 127-130. In particular, the 2-bit priority levels assigned to the resonators 708-711 can be "00," "01," "10," and "11," respectively, which are listed below each resonator in FIG. 7A, and where "00" corresponds to the highest priority level, "01" corresponds to the second highest priority level, "10" corresponds to the third highest priority level, and "11" corresponds to the lowest priority level. The bits "0" and "1" can be realized by assigning the bit "0" to a low or no electronic signal and the bit "1" to a relatively high electronic signal. The resonators 708-711 are configured to extract the corresponding wavelengths 127-130 from the waveguide 102 when activated. The request latch 706 receives electronic signals from the node at inputs D1, D2, D3 and the system clock signal at CLK. The two inputs D1 and D2 receive the 2-bit priority level and the third input D3 receives an electronic request signal indicating that the node is ready to activate the resonator associated with the 2-bit priority level. The request latch 706 outputs the 2-bit priority level and the request signal on either the rising or falling edge of the clock signal. The ENB 702 receives the 2-bit priority level and the request signal and activates the resonator associated with the 2-bit priority level.

Figure 7B:
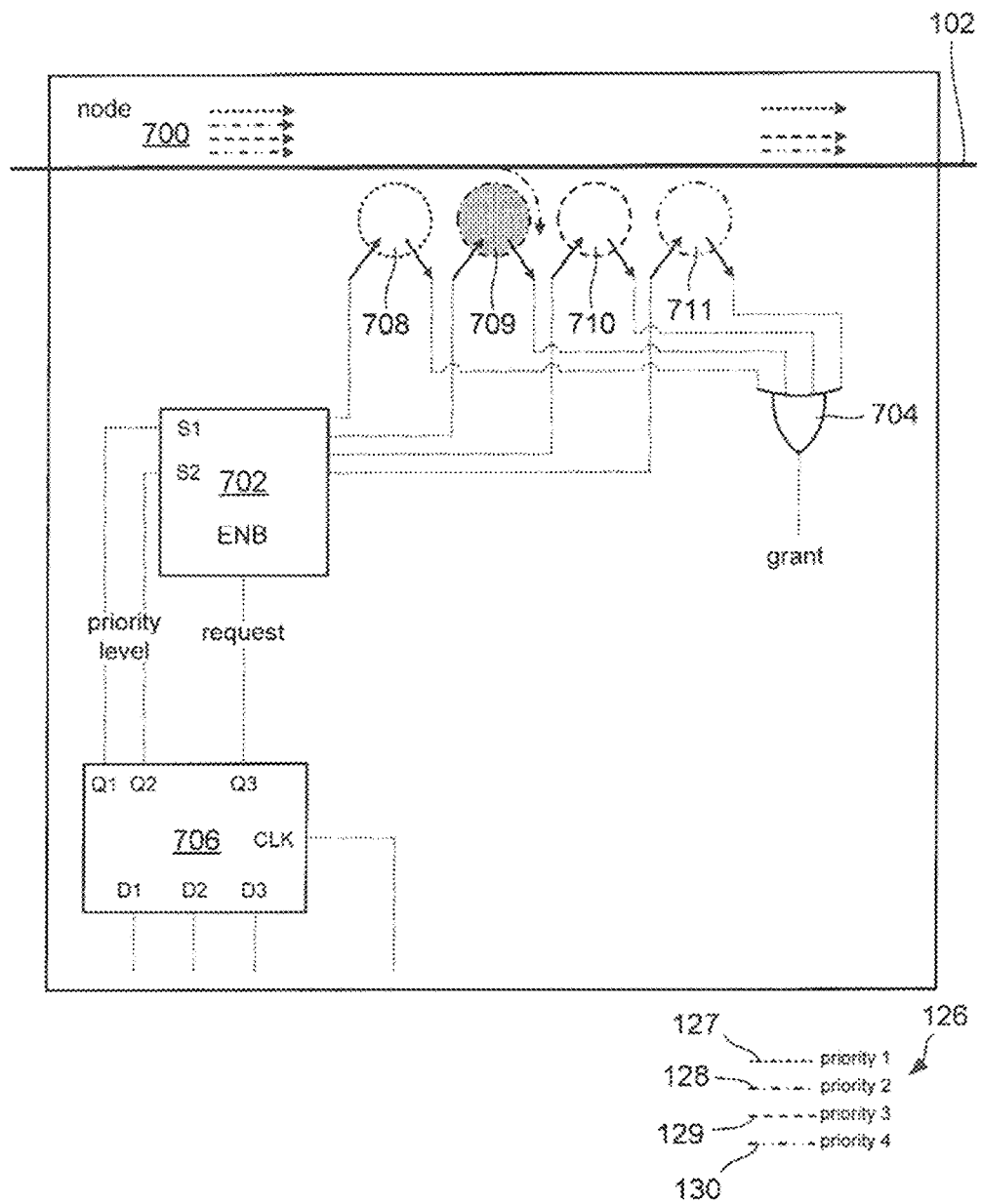
FIG. 7B shows the node, shown in FIG. 7A, operated in accordance with embodiments of the present invention.

FIG. 7B shows an exemplary operation of the node 700 in accordance with embodiments of the present invention. Assume that the node 700 in an independent operation selects the second highest priority level in requesting access to a shared resource. The node 700 then sends the 2-bit priority level "01" to the request latch 706 which stores the bits until the request latch 706 receives a request signal. When the node 700 is ready to request access to the resource, the node 700 sends a request signal to the request latch 706 which simultaneously and separately latches the bits "0" and "1" into the inputs S1 and S2 and latches the request signal to the ENB 702 on either a rising or falling time step of the clock signal. The ENB 702 upon receiving the 2-bit priority level activates the corresponding resonator 709. The activated resonator 709 is shaded, and the inactive resonators 708, 710, and 711 are unshaded. As shown in FIG. 7B, the activated resonator 709 extracts the corresponding wavelength 128 from the waveguide 102. The other wavelengths 127, 129, and 130 pass the resonators 708, 710, and 711 undisturbed. The activated resonator 709 sends an electronic signal to the OR gate 704, which responds by sending a signal to node 200. The node interprets the signal to mean that the node has successfully completed a request for access to the resource. The operation is repeated during the grant phase.

Figure 8A:
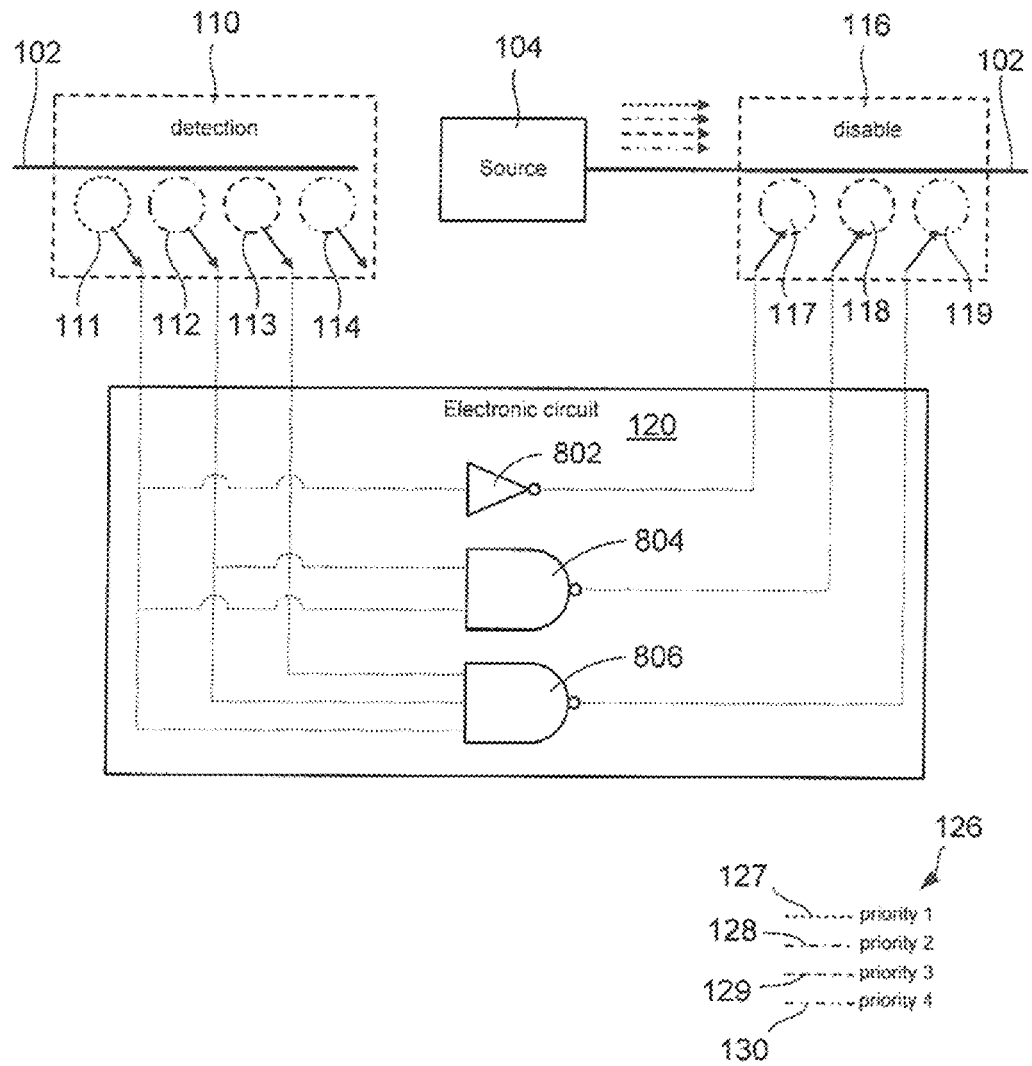
FIG. 8A shows a circuit diagram of electronic components of an electronic circuit configured in accordance with embodiments of the present invention.

FIG. 8A shows a circuit diagram of the electronic circuit 120 configured in accordance with embodiments of the present invention. The components of the electronic circuit 120 include an inverter 802, a first NAND gate 804, and a second NAND gate 806. FIG. 8A reveals how the detecting resonators 111-113 are electronically coupled to the inverter 802 and NAND gates 804 and 806. The detecting resonator 114 extracts the lowest priority wavelength 130 from the waveguide 102 in order to keep the wavelength 130 from being reflected back into the waveguide 102.

When the wavelength 127 is detected by the detecting resonator 111, electronic signals are input from the detecting resonator 111 to the inverter 802 and NAND gates 804 and 806. When the wavelength 128 is detected by the detecting resonator 112, electronic signals are input from the detecting resonator 112 to the NAND gates 804 and 806. When the wavelength 129 is detected by the detecting resonator 113, electronic signals are input from the detecting resonator 113 to the NAND gate 806. The inverter 802 outputs electronic signals to the disabling resonator 117, and the NAND gates 804 and 806 output electronic signals to the disabling resonators 118 and 119, respectively. As described above, each of the detecting resonators 111-113 generates relatively high electronic signals when light of a corresponding wavelength is trapped in the detecting resonator and generates a relative low or no electronic signal when no light is trapped in the detecting resonator. The inverter 802 converts a relatively high electronic signal received from the detecting resonator 111 into a relatively low electronic signal that is sent to the disabling resonator 117 and converts a relatively low or no electronic signal received from the detecting resonator 117 into a relatively high electronic signal that is sent to the disabling resonator 117. The NAND gates 804 and 806 output a low or no electronic signal to the disabling resonators 118 and 119 when all of the input electronic signals are relatively high and output a relatively high electronic signal to the disabling resonators 118 and 119 when at least one of the input electronic signals is low.

Figure 8B:
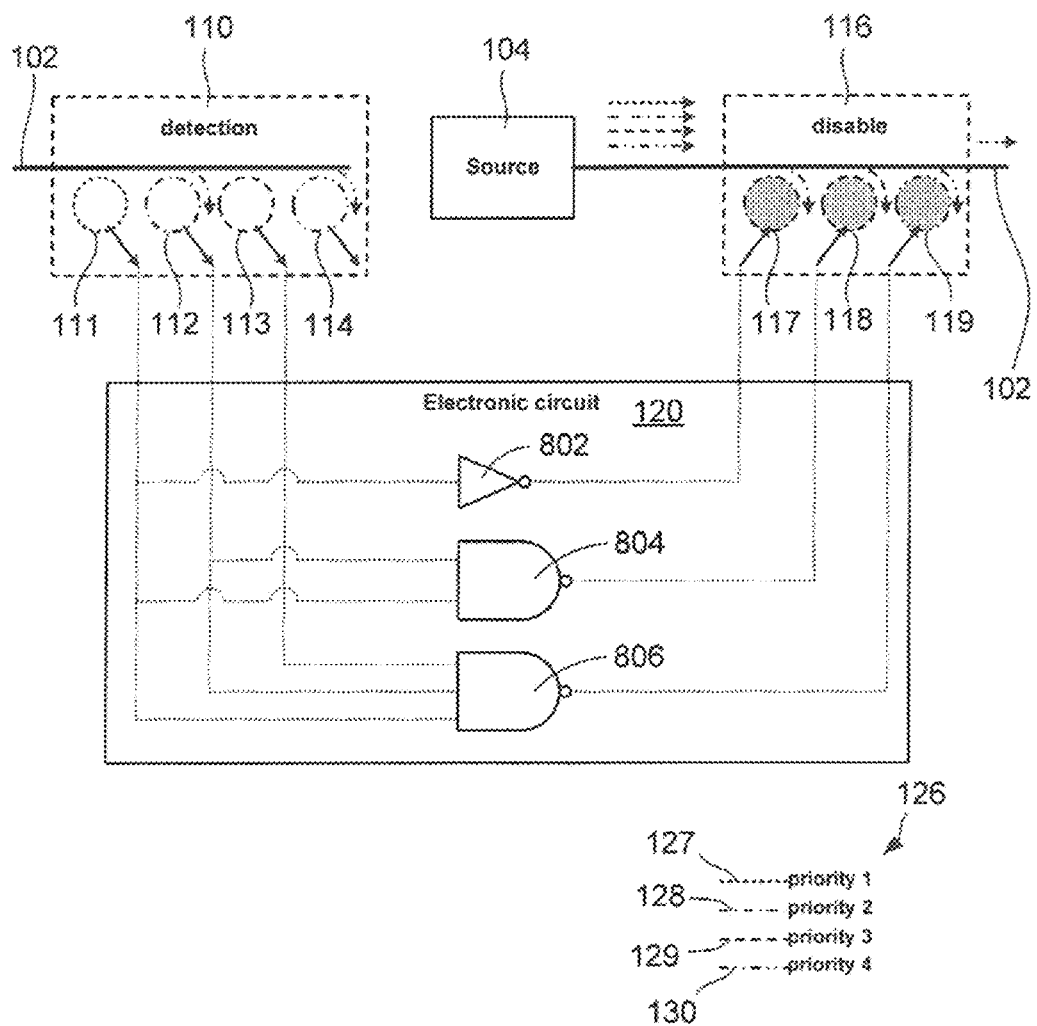
FIG. 8B shows the electronic circuit, shown in FIG. 8A, operated in accordance with embodiments of the present invention.

FIG. 8B shows the electronic circuit, shown in FIG. 8A, operated in accordance with embodiments of the present invention. Detecting resonators 112 and 114 extract the wavelengths 128 and 130, respectively, and the wavelengths 127 and 129 do not reach the detecting resonators 111 and 113. The wavelengths 127 and 129 may have been extracted by nodes along the waveguide, as described above with reference to FIG. 2. In other words, a node has selected the highest priority level and another node has selected the third highest priority level during the request phase. As a result, the detecting resonator 112 sends relatively high electronic signals to the NAND gates 804 and 806. On the other hand, the detecting resonator 111 sends a low or no electronic signal to the inverter 802 and to an input of the NAND gate 804, and the detecting resonator 113 sends a low or no electronic signal to an input of the NAND gate 806, respectively. The inverter 802 responds to the low or no electronic signal received from the detecting resonator 111 by sending a high electronic signal that activates the disabling resonator 117. The NAND gate 804 responds to low and relative high electronic signals received from the detecting resonators 111 and 113, respectively, by activating the disabling resonator 118. Finally, the NAND gate 804 responds to low electronic signals sent by the detecting resonators 111 and 113 and the relative high electronic signals received from the detecting resonator 112 by activating the disabling resonator 119. The active disabling resonators 117-119 are shaded and extract the wavelengths 128-130 from the waveguide 102 leaving the highest priority wavelength 127 to propagate along on the waveguide 102 so that the node having selected the highest priority level can extract the wavelength 127 and realize that it has been granted access to the resource. Meanwhile the node that extracted the third highest priority level does not extract the wavelength 129 during the grant phase and realizes that it has not been granted access to the resource.

Figure 9:
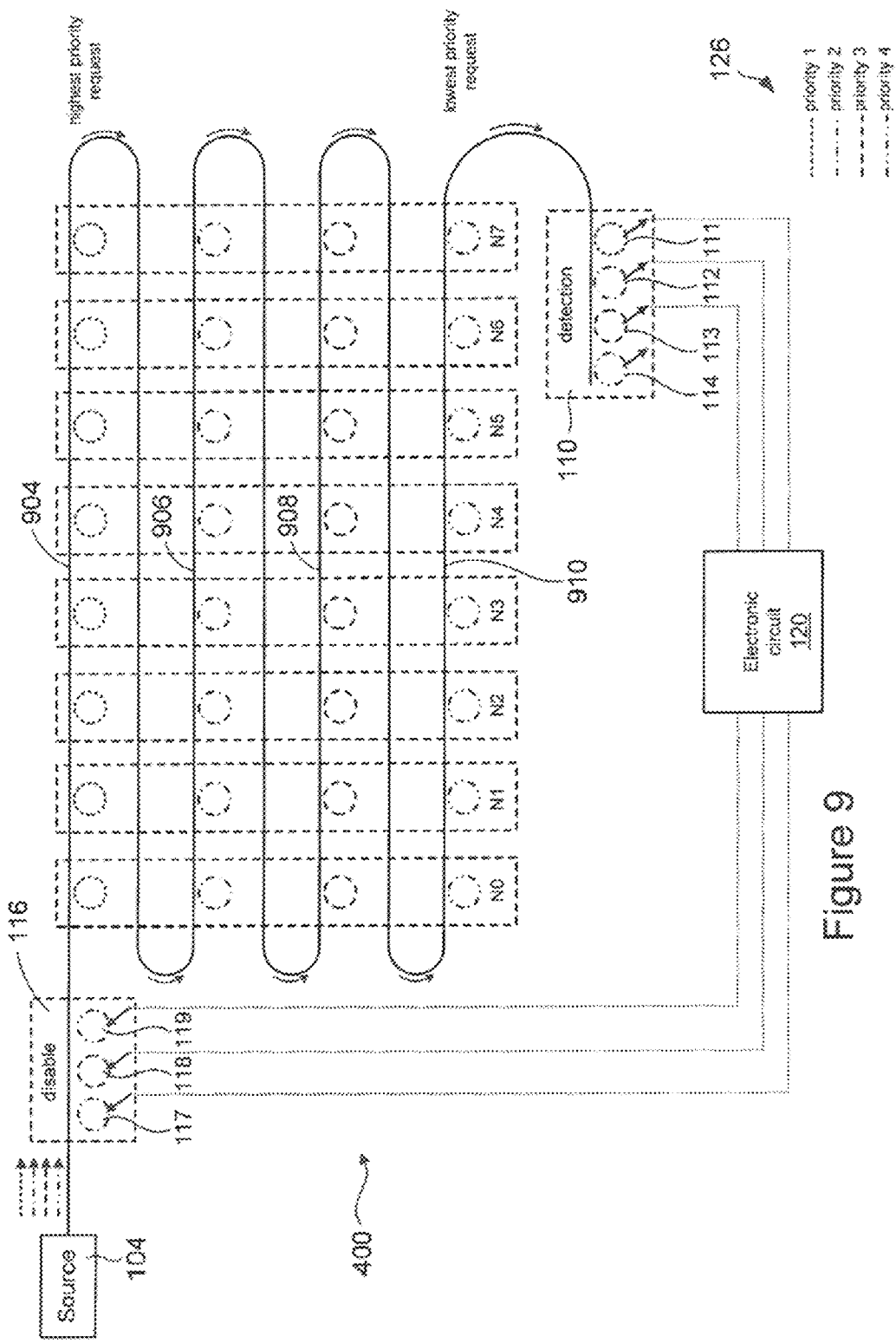
FIG. 9 shows a schematic representation of a second optical arbitration system configured in accordance with embodiments of the present invention.

Arbitration system embodiments are not limited to eight nodes and the particular arrangement of nodes shown in FIG. 1. Arbitration system embodiments can be configured to provide prioritized optical arbitration for any number of nodes having any possible arrangement. FIG. 9 shows a schematic representation of a second optical arbitration system 900 configured in accordance with embodiments of the present invention. The system 900 includes a waveguide 902, the optical power source 104 optically coupled to a first end of the waveguide 902, and 8 sets of four resonators. The system also includes the disable element 116 disposed between the source 104 and node N0, the detection element 110 optically coupled to a second end of the waveguide 902, and the electronic circuit 120 electronically coupled to the disabling resonators 117-119 of the disable element 116 and the detecting resonators 111-114 of the detection element 110. The resonators and the waveguide 902 are configured so that the a first portion of the waveguide 904 is adjacent to all of the resonators associated with the highest priority level, a second portion of the waveguide 906 is adjacent to all of the resonators associated with the second highest priority level, a third portion of the waveguide 908 is adjacent to all of the resonators associated with the third highest priority level, and a fourth portion of the waveguide 910 is adjacent to all of the resonators associated with the lowest priority level.

Figure 10:
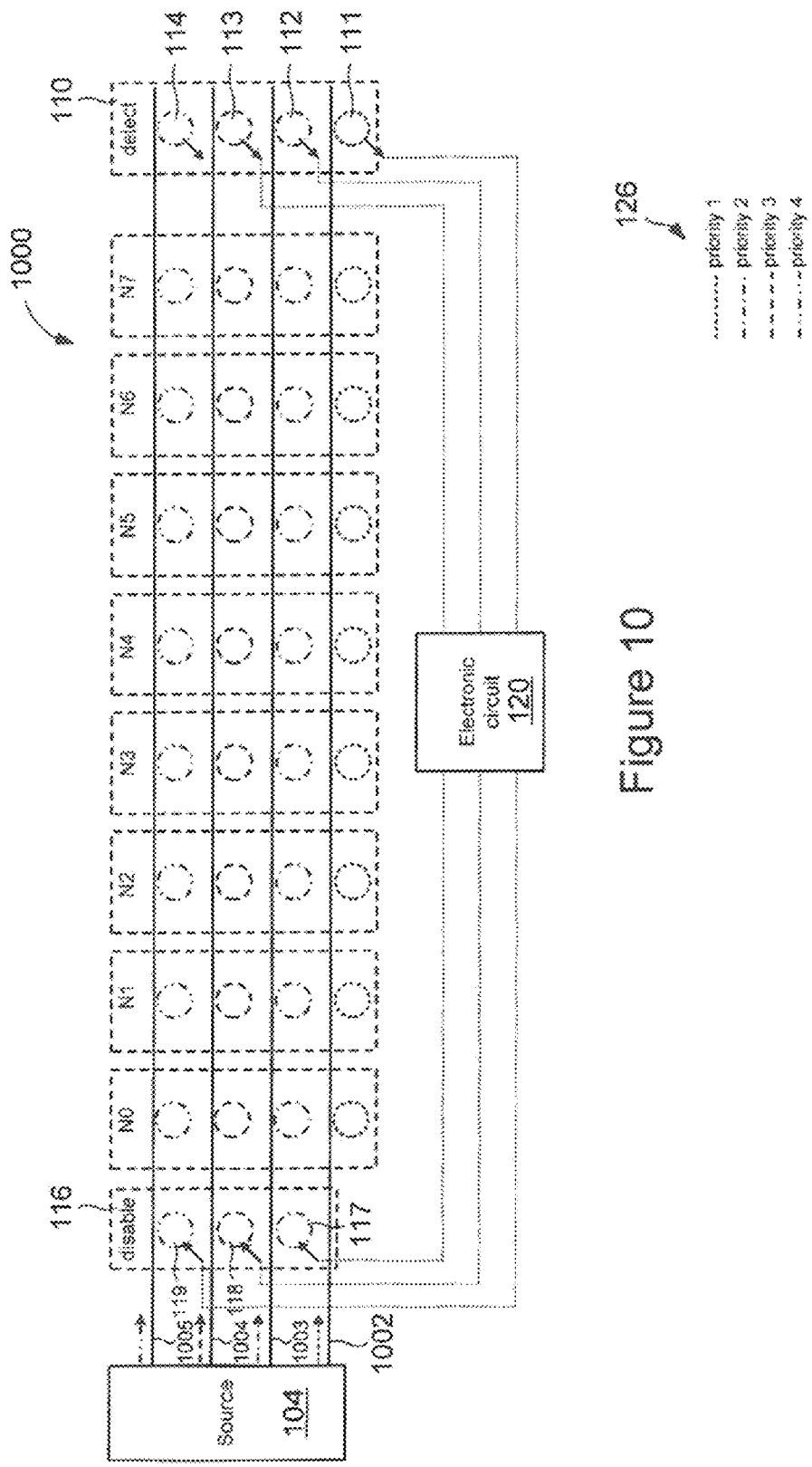
FIG. 10 shows a schematic representation of a third optical arbitration system configured in accordance with embodiments of the present invention.

Arbitration system embodiments are not limited to a single waveguide configured to carry the wavelengths associated with each priority level, such as waveguides 102 and 902. In other embodiments, each wavelength can be transmitted in a separate waveguide. FIG. 10 shows a schematic representation of a third optical arbitration system 1000 configured in accordance with embodiments of the present invention. The system 1000 includes four separate waveguides 1002-1005, an optical power source 104 optically coupled to a first end of each of the waveguides 1002-1005, and 8 sets of four resonators. The system 400 also includes the disable element 116 disposed between the source 104 and node N0, the detection element 110 optically coupled to the second ends of the waveguides 1002-1005, and the electronic circuit 120 electronically coupled to the disabling resonators 117-119 of the disable element 116 and the detecting resonators 111-114 of the detection element 110. The waveguides 1002-1005 separately carry the four wavelengths 127-130, respectively. The resonators associated with highest priority level are disposed adjacent to the waveguide 1002, the resonators associated with second highest priority level are disposed adjacent to the waveguide 1003, the resonators associated with third highest priority level are disposed adjacent to the waveguide 1004, and the resonators associated with lowest priority level are disposed adjacent to the waveguide 1005.

II. Systems and Methods for Performing Prioritized Optical Arbitration Using Time-division Multiplexed Arbitration

A. An Optical Arbitration System

Figure 11:
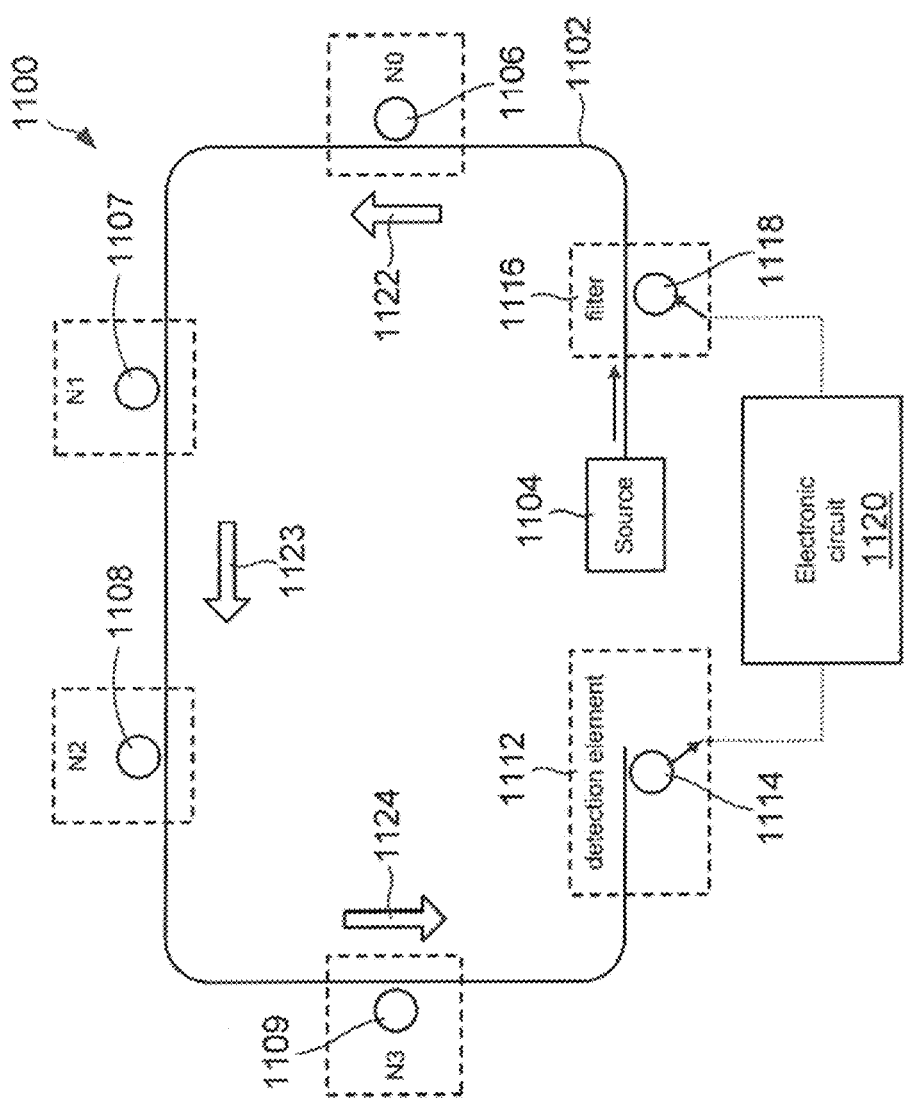
FIG. 11 shows a schematic representation of a second optical arbitration system configured in accordance with embodiments of the present invention.

FIG. 11 shows a schematic representation of an optical arbitration system 1100 configured in accordance with embodiments of the present invention. The system 1100 includes a waveguide 1102, an optical power source 1104 optically coupled to a first end of the waveguide 1102, and four substantially identical node resonators 1106-1109. Each node resonator is optically coupled to the waveguide 1102 and electronically coupled to one of four nodes labeled N0 through N3. The system 1100 also includes an arbiter comprising a detection element 1112 and a disable element 1116. The detection element 1112 comprising a detecting resonator 1114 disposed near a second end of the waveguide 1102, and the disable element 1116 comprising a disabling resonator 1118 optically coupled to the waveguide 1102 between the source 1104 and node N0. The arbiter also includes an electronic circuit 120 that is electronically coupled to the detecting resonator 1114 and the disabling resonator 1118. As shown in the example of FIG. 11, light comprising a single unmodulated wavelength is output from the optical power source 1104 and injected into the waveguide 1102. The light travels in a counter-clockwise manner along the waveguide 1102, as indicated by directional arrows 1122-1124, passing the disable element 1116, each node resonator, and finally arrives at the detection element 1112. The waveguide 1102 can be a ridge waveguide, a photonic crystal waveguide, or an optical fiber. The resonators 1106-1109, detecting resonator 1114, and disabling resonator 1118 can be configured and operated as described above with reference to FIG. 1.

B. Time-division Multiplexed Arbitration

Prioritized arbitration can be carried out on the arbitration system 1100 by time-division multiplexing the priority levels within each round of arbitration. Consistent with the prioritized WDM arbitration described above, each round of prioritized TDM arbitration is carried out with (1) a request phase followed by (2) a grant phase. At the beginning of the request and grant phases a token is injected into the waveguide 1102. The token is a pulse of light having a particular wavelength and finite duration. Each portion of the token is associated with a particular priority level. For example, a token associated with three prior levels comprises three portions with the first portion passing a node associated with the highest priority level, the second portion passing the node associated with the second highest priority level, and the third portion passing the node associated with the lowest priority level. The time when the token passes each node is different due to the distance between nodes, which is a fixed offset. In order for a node to assert a request or determine whether or not a request is granted for a particular priority level, the node extracts the portion of the token corresponding to the priority level. For example, a first node asserting a priority level 2 request in a system employing three priority levels extracts the middle portion of the token leaving a gap between the first and third portions of the token. A second node located farther along the waveguide 1102 and asserting a priority level 1 request extracts the first portion of the token. Thus, unlike wavelength division multiplexing were each priority level is associated with a particular wavelength of light, in time-division multiplexing, each priority level is associated with a particular portion of the token.

Figure 12:
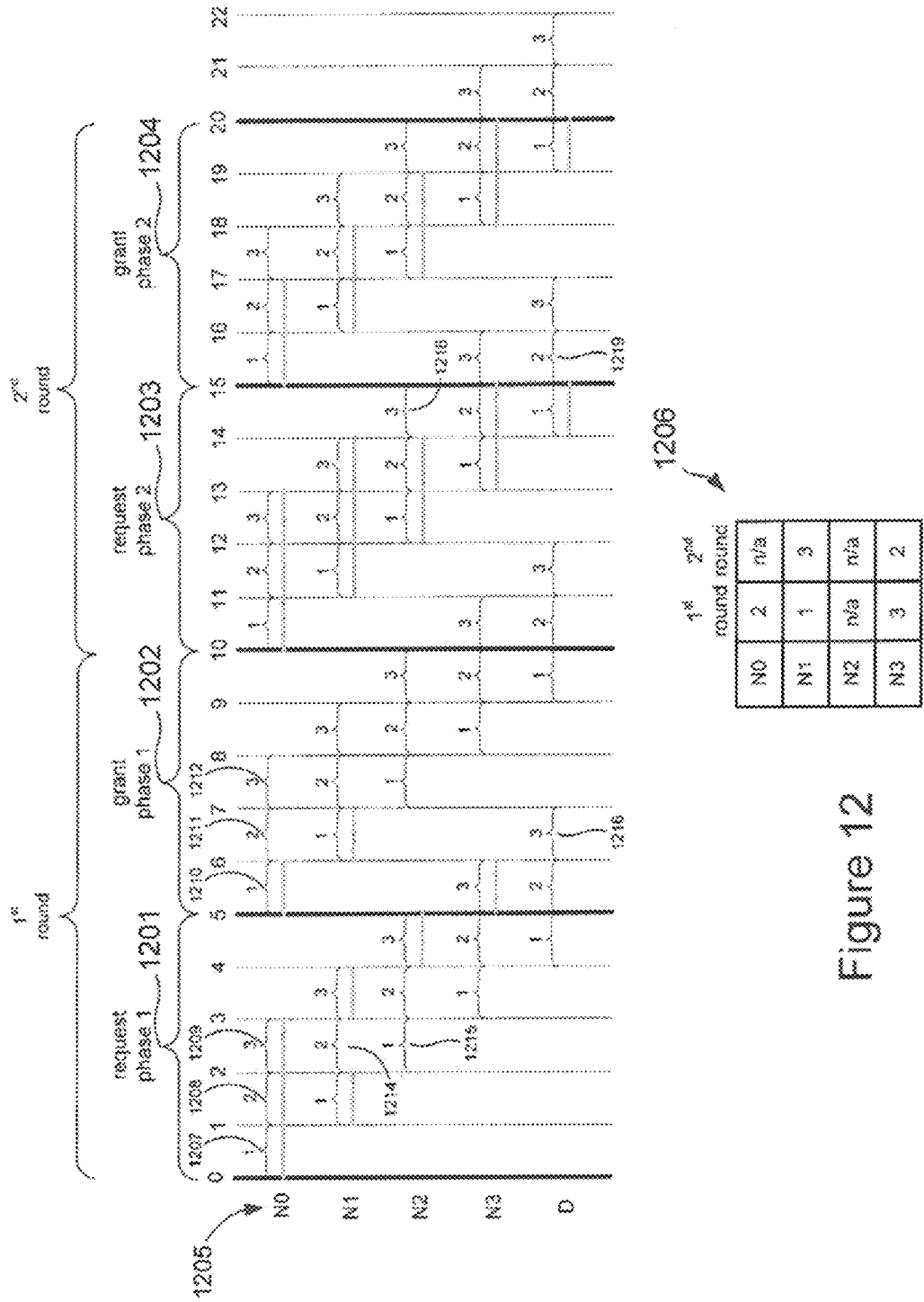
FIG. 12 shows an example timing diagram associated with two rounds of prioritized time-division multiplexed arbitration performed on the optical arbitration system shown in FIG. 11 in accordance with embodiments of the present invention.

FIG. 12 shows an example timing diagram associated with two rounds of prioritized TDM arbitration performed on the system 1100 in accordance with embodiments of the present invention. The first round of arbitration includes a first request phase 1201 followed by a first grant phase 1202, and the second round of arbitration includes a second request phase 1203 followed by a second grant phase 1204. Column 1205 lists the node labels N0 through N3 and a label D representing the detection element 1114 in FIG. 11. A table 1206 displays the node labels N0 through N3 and lists in columns the priority levels selected by the nodes for two rounds of arbitration. The nodes have three priority levels to select from. For example, in the first round of arbitration, nodes N0, N1, and N3 selected priority levels 2, 1, and 3, respectively, and node N2 has elected not to participate. The time slots are labeled with the priority levels in which each node can assert a request or learn that a successful request has been granted or denied. For example, node N0 can assert a priority level 1 request 1207 beginning at time step 0, assert a priority level 2 request 1208 beginning at time step 1, and assert a priority level 3 request 1209 beginning at time step 2. In addition, node N0 can learn whether or not a priority level 1 request has been granted 1210 beginning with time step 5, learn whether or not a request for a priority level 2 request has been granted 1211 beginning with time step 6, and learn whether or not a request for a priority level 3 has been granted 1212 beginning with time step 7. A node wins a request or is granted access to a resource when the node extracts the portion of the token from the waveguide 1102 during of the time slot associated with the priority level selected by the node.

With reference to FIG. 11, the example timing diagram shown in FIG. 12 is described as follows. Because there are only three priority levels, a token associated with three priority levels is injected into the waveguide 1102. For the sake of simplicity the duration of the token is approximately three time slots. In order to inject the token into the waveguide 1102, the electronic circuit 1120 deactivates the disabling resonator 1118 for a period of three time slots. Because node N0 selected priority level 2, beginning at time step 1 node N0 activates the resonator 1106 and begins extracting the portion of the token associated with priority level 2 from the waveguide 1102 leaving a gap 1214 that subsequently reaches nodes N1, N2, and N3 at time steps 2, 3, and 4, respectively, and reaches detecting resonator D at time step 5. Likewise, nodes N1 and N3 selected priority levels 1 and 3 and extract the light beginning at time steps 1 and 5 leaving gaps 1215 and 1216, respectively, traveling along the waveguide 1102. The detecting resonator D does not receive the portion of token associated with the highest priority level 1 beginning with time step 4. As a result, the electronic circuit 1120 determines that the highest priority level has been selected by one of the nodes and responds at the beginning of the first grant phase 1202 by inactivating the disabling resonator 1118 in order to inject a token with a duration of one time slot associated with the highest priority level 1 into the waveguide 1102. In other words, a token one time slot long is placed on the waveguide 1102 to pass each node during the time slot associated with the highest priority level 1. Because node N1 is the only node that selected the highest priority level 1, node N1 activates the resonator 1107 to extract the portion of token associated with the highest priority level from the waveguide beginning at time step 6. Node N1 can then begin using the resource at time step 6. Because portions of the token associated with priority levels 2 and 3 are not present light does not pass nodes N0 and N3 at time steps 8 and 10, respectively, which are the time steps marking the time slots when nodes N0 and N3 can extract light in the grant phase. Thus, nodes N0 and N3 realize they have not been granted access to the resource for the first round of arbitration.

The request phase 2 for the second round of arbitration 1203 begins at time step 10. Table 1206 shows that in the second round of arbitration, nodes N1 and N3 have selected priority levels 3 and 2, respectively, and nodes N0 and N2 have elected not to participate. Nodes N1 and N3 extract the light beginning at time steps 13 and 14, respectively, leaving gaps 1218 and 1219 traveling along the waveguide 1102. The detecting resonator D does not receive light during the time slots beginning with time steps 15 and 16 and the electronic circuit 1120 responds at the beginning of the second grant phase 1202 by inactivating the disabling resonator 1118, in FIG. 1, placing a token with a portion associated with the highest priority level and the second highest priority level into the waveguide 1102. Thus no light reaches node N1 at the beginning of time step 18 when node N1 activates its resonator 1107. As a result, node N1 realizes that it has not been granted access to the resource for the second round of arbitration. On the other hand, node N3 activates its resonator 1109 at time step 19 and extracts light during the time slot associated with priority level 2. As a result, node N3 realizes that it has been granted access to the resource and can begin using the resource.

The prioritized TDM arbitration method described above with reference to FIG. 12 also favor nodes that lie closest to the optical power source 1104. Thus, embodiments of the present invention also allow nodes to increment or increase the priority level when they have either not achieved a successful request or have not been granted access during the grant phase. Increasing the priority level can be based on a class of service agreement, type of information to be transmitted; global age of information, length of time information has been stored at the node, and present length of time before information expires. For example, suppose node N2 is sending VoIP packets that must be sent to avoid interruption in a communication. In certain embodiments, after each unsuccessful round of arbitration, node N2 can accordingly increase the priority level. In other embodiments, node N2 can increase the priority level following an unsuccessful request phase or an unsuccessful grant phase.

C. Summary of Time-division Multiplexed Arbitration

Figure 13:
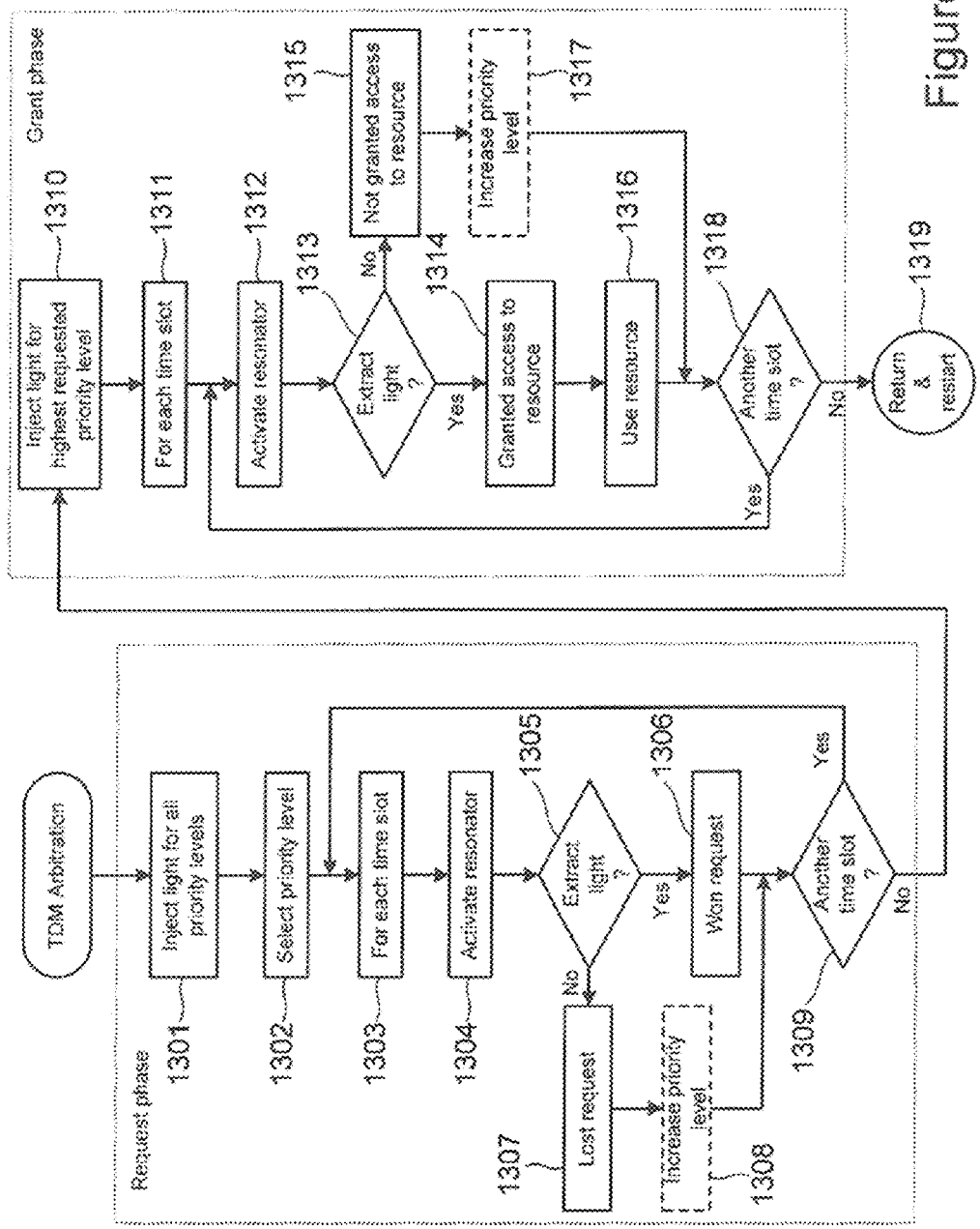
FIG. 13 shows a control-flow diagram representing steps associated with a method for prioritized time-division multiplexed arbitration for a shared resource in accordance with embodiments of the present invention.

FIG. 13 shows a control-flow diagram representing steps associated with a method for performing prioritized TDM arbitration for a shared resource in accordance with embodiments of the present invention. As shown in FIG. 13, steps 1301-1309 are steps performed during a request phase, and steps 1309-1318 are steps performed during a grant phase. In step 1301, a light pulse of a particular wavelength is injected into a waveguide from an optical power source, as described above with reference to FIG. 11. The duration of the light is determined by the number of priority levels and the number of time slots used to assert a priority level request. For example, as described above with reference to FIG. 12, there were only three priority levels and each node asserts a request for the duration of one time slot. Thus, the pulse of light has a duration of approximately three time slots. In step 1302, the nodes electing to participate in a round of arbitration and each selects a priority level for accessing the shared resource. The node electing to participate has no knowledge of the priority levels selected by other participating nodes, and thus, each node independently selects a priority level. In the for-loop beginning with step 1303, steps 1304-1309 are repeated for each node participating in the request phase. In step 1304, a node activates a resonator to extract a portion of the pulse from the waveguide during the time slot corresponding to the priority level selected by the node. In step 1305, when the node extracts light during the time slot corresponding to the priority level selected by the node, the method proceeds to step 1306, otherwise, the node was not successful in extracting the light and the method proceeds to step 1307. In step 1306, the node recognizes that the node successfully completed the request, deactivates the resonator, and waits for the subsequent grant phase to determine whether or not the request is granted. In step 1307, the node recognizes that the request was not successful, and the node waits for a later round of arbitration to assert another request. In optional step 1308, a node that is unsuccessful in asserting a request during the request phase can increment the priority level in order to increase the node's chances of success in a subsequent round of arbitration. For example, a node sending VOIP packets may increase to the highest priority level for a subsequent round of arbitration or a node can increment the priority level associated with certain packets that are time stamped and have to be sent before they expire. In step 1309, when another time slot is available, steps 1305-1309 are repeated, otherwise, the method proceeds to step 1310 at the beginning of the grant phase. In step 1310, a pulse of light is injected into the waveguide from an optical power source. The pulse is injected so that the node selecting the highest priority level that is closest to the optical power source along the waveguide can extract the light during the highest priority level selected by the node. In the for-loop beginning with step 1311, steps 1312-1317 are repeated for each time slot in the grant phase. In step 1312, each node completing a successful request phase activates the resonator during the time slot associated with the priority level selected by the node. In step 1313, when a node extracts light from the waveguide the method proceeds to step 1314, otherwise the method proceeds to step 1315. In step 1314, the node realizes that it is granted access to the resource, and in subsequent step 1316, the node begins using the resource, as described above with reference to FIG. 14. In step 1315, the node realizes that is has not been granted access, and in optional step 1317, the node increases the node's priority level in a subsequent round of arbitration. In step 1318, when another time slot in the grant phase is available, steps 1312-1316 are repeated, otherwise, proceed to step 1319, where the TDM arbitration method is repeated for a subsequent round of arbitration.

D. Schematic Circuit Diagrams of Nodes and the Electronic Circuit

Figure 14:
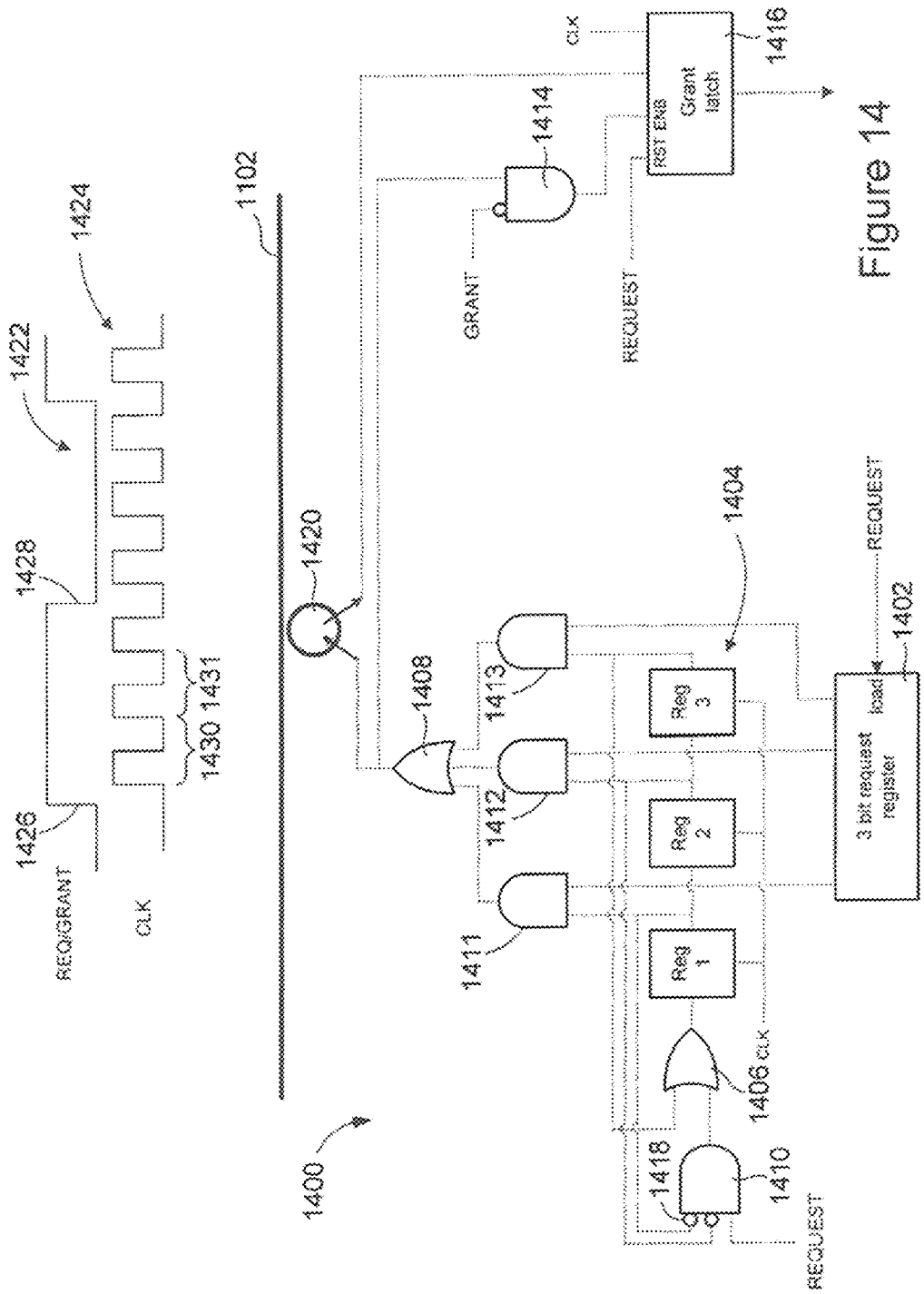
FIG. 14 shows a circuit diagram of a node configured in accordance with embodiments of the present invention.

FIG. 14 shows a schematic circuit diagram of electronic components of a node 1400 configured in accordance with embodiments of the present invention. The node 1400 represents the configuration of electronic components for each node in FIG. 11. The electronic components include a 3-bit request register 1402, a shift register 1404 comprising three registers labeled 1-3, two OR gates 1406 and 1408, five AND gates 1410-1414, and a grant latch 1416. As shown in FIG. 14, the registers 1-3 are arranged in a series with the output of register 1 input to register 2 and the output of register 2 input to register 3. A logic value shifts from one register to the next in accordance with either the rising or falling edge of the clock signal CLK. The AND gates 1411-1413 each receive as input a first logic value from the 3-bit register 1402 and a second logic value from registers 1-3, respectively. The outputs from registers 1 and 2 also loop back around and are inverted by inverters, such as inverter 1418, prior to being input to AND gate 1410, which also receives as input request signal at the beginning of each request phase. The outputs of AND gates 1411-1413 are input to the OR gate 1408 which sends an electronic signal that activates the node resonator 1420 and is input to AND gate 1414. The AND gate 1414 also includes an inverter at the input of a grant signal sent to the AND gate 1414 at the beginning of the grant phase. When the resonator 1420 traps light an electronic signal is generated and sent to the grant latch 1416. The grant latch 1416 also receives the system clock CLK.

FIG. 14 also includes an example of a request/grant clock signal 1422 and a system clock signal 1424. One complete request/grant clock cycle is shown with the request phase beginning on rising edge 1426 and grant phase beginning on falling edge 1428. For the sake of convenience and simplicity, it is assumed that there are only three priority levels, and the request and grant phases are each three system clock cycles long. The 3-bit binary strings "100," "010," "001" can represent the priority levels 1, 2, and 3, respectively, and the binary string "000" can represent no request. At the beginning of a request phase, the 3-bit register 1402 is loaded with the request for a priority level. A request signal clears the grant latch 1416, and a request signal corresponding to logic "1" is input to the AND gate 1410. The OR gate 1406 receives a logic "1" input from the AND gate 1410 and logic "0" from register 3 and inputs a logic "1" to register 1. The shift register 1404 cycles through the priorities "100," "010," and "001" on the rising edge of each clock cycle during the request phase and cycle once again the priorities for the grant phase. For example, during the clock cycle 1430, the shift register 1404 outputs the logic values "1," "0," and "0" to the AND gates 1411-1413, respectively, and during the clock cycle 1431, the shift register outputs the logic values "0," "1," and "0" to the AND gates 1411-1413, respectively. When the contents of the shift register 1404 matches the output from the 3-bit register 1402, the AND gate 1412 outputs an electronic signal to the OR gate 1408 and the node resonator 1420 is activated. During the grant phase, the grant latch 1416 is loaded when the resonator 1420 is active and extracts a portion of the token travelling along the waveguide 1102 corresponding to the priority level selected by the node 1400.

Figure 15:
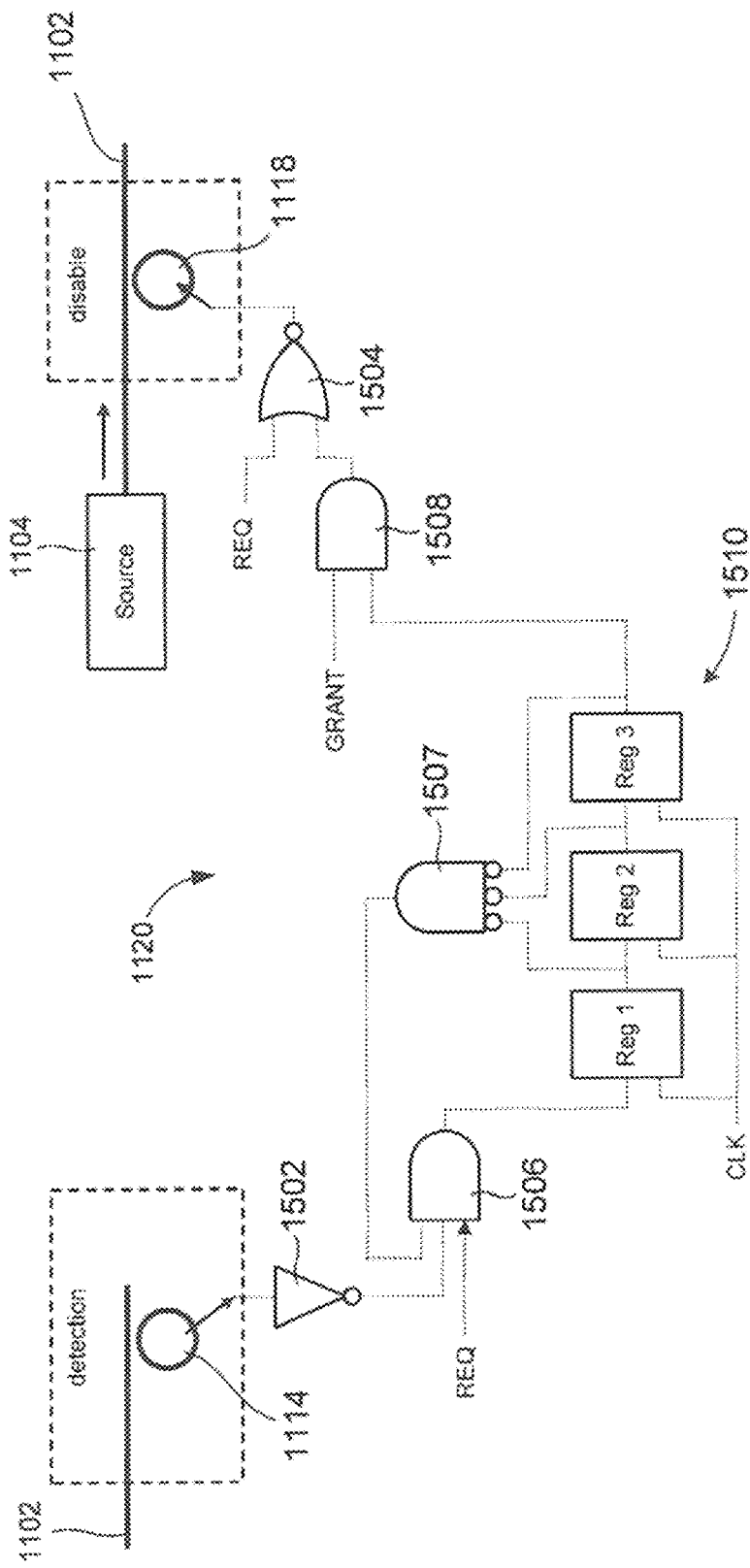
FIG. 15 shows a circuit diagram of a second electronic configured in accordance with embodiments of the present invention.

FIG. 15 shows a schematic circuit diagram of electronic components of the second electronic circuit 1120 configured in accordance with embodiments of the present invention. The electronic circuit 1120 includes an inverter 1502, a NOR gate 1504, AND gates 1506-1508, and a shift register 1510. The shift register 1510 is loaded according to the outputs of the detecting resonator 1114. At the beginning of a request phase, the NOR gate 1504 receives a request signal corresponding to logic "1." As a result, the NOR gate 1304 does not output a signal to the disable resonator 1118 and the disable resonator 1118 remains inactive during the request phase so that a token with a three clock cycle duration can be placed on the waveguide 1102. In the request phase, the results of the arbitration shift to the shift register 1510. When there are multiple priority level requests, the logic gates 1507 and 1506 ensure that only the first of multiple request is set, so that at the end of the request phase the shift register 1510 contains a single set bit in the position of the highest priority level requested at register 3 or is empty in the case of no requests. During the grant phase the contents of the shift register 1510 are used to control the disabling resonator 1118, such that a token is injected into the waveguide 1102 only for the selected priority level during the appropriate time slot.

III. On-chip Implementations

The optical arbitration systems 100 and 1100 can be implemented in an optical layer on a single chip. For example, in certain embodiments, the chip size can be approximately 25×25 mm and have 64 or more nodes. The waveguides can have cross-sectional dimensions of approximately 200×500 nm, the sets of resonators and detecting resonators, described above with reference to FIGS. 1, 9, 10, and 11 can have diameters ranging from approximately 20-60 μm, the wavelength selective elements can be separated by 0.5-5 μm, the diameter of the wavelength selective elements can range from approximately 1-20 μm. Note that these dimension ranges represent exemplary ranges and are by no means intended to limit the broad range of dimensions over which optical arbitration systems can be employed. Thus, these dimensions and dimension ranges can vary depending on the particular implementation.

IV. Microring Resonators

Figure 16A:
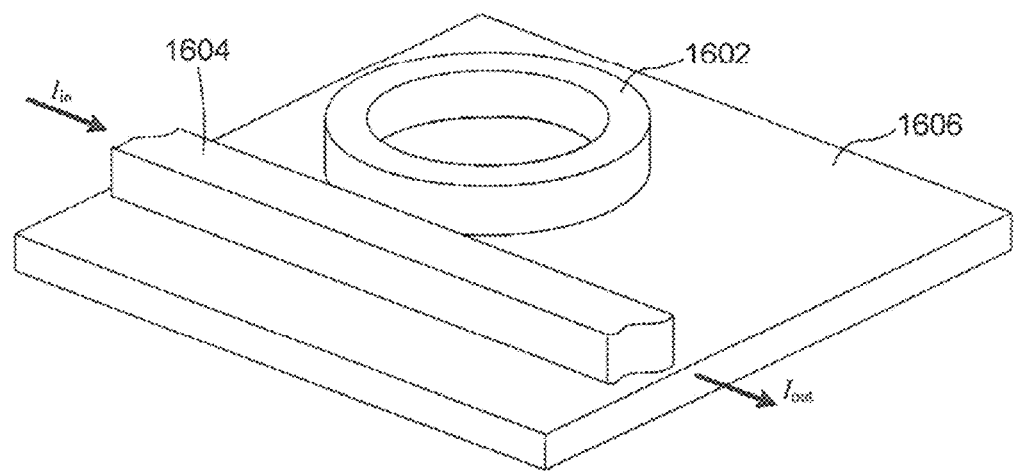
FIG. 16A shows an isometric view of a microring resonator and a portion of an adjacent ridge waveguide disposed on the surface of a substrate and configured in accordance with embodiments of the present invention.

In certain system embodiments, the waveguides can be ridge waveguides, and the wavelength selective elements can be microring resonators. FIG. 16A shows an isometric view of a microring resonator 1602 and a portion of an adjacent ridge waveguide 1604 disposed on the surface of a substrate 1606 and configured in accordance with embodiments of the present invention. Light of a particular wavelength transmitted along the waveguide 1604 is evanescently coupled from the waveguide 1604 into the microring 1602 when the wavelength satisfies the resonance condition:

$$n_{eff}C = \lambda m$$

where $n_{eff}$ is the effective refractive index of the microring 1602, C is the circumference of the microring 1602, m is an integer, and λ is the wavelength. The product $n_{eff}C$ is the optical length of the cavity. In other words, wavelengths that are integer multiples of the wavelength λ are evanescently coupled from the waveguide 1604 into the microring 1602.

Evanescent coupling is the process by which evanescent waves of light are transmitted from one medium, such as microring, to another medium, such a ridge waveguide, and vice versa. For example, evanescent coupling between the microring resonator 1602 and the ridge waveguide 1604 occurs when the evanescent field generated by light propagating in the waveguide 1604 couples into the microring 1602. Assuming the microring 1602 is configured to support the modes of the evanescent field, the evanescent field gives rise to light that propagates in the microring 1602, thereby evanescently coupling the light from the waveguide 1604 into the microring 1602.

Figure 16B:
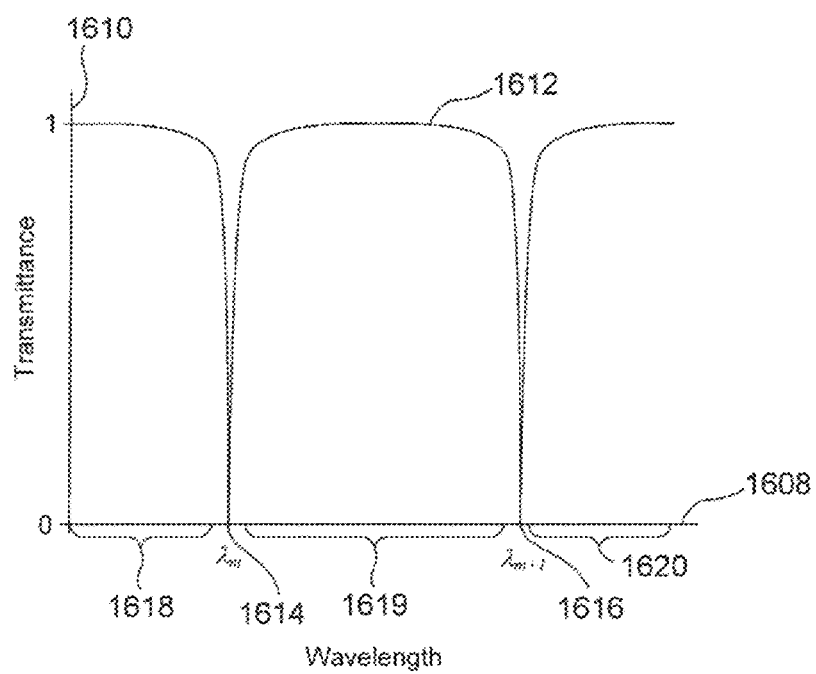
FIG. 16B shows a plot of transmittance versus wavelength for the microring and waveguide shown in FIG. 16A.

FIG. 16B shows a plot of transmittance versus wavelength for the microring 1602 and the waveguide 1604 shown in FIG. 16A. Horizontal line 1608 represents a wavelength axis, vertical line 1610 represents a transmittance axis, and curve 1612 represent the transmittance of light passing the microring 1602 over a range of wavelengths. The transmittance of light passing the microring 1602 is defined by:

$$T = \frac{I_{out}}{I_{in}}$$

where $I_{in}$ is the intensity of the light propagating along the waveguide 1604 prior to reaching the microring 1602, and $I_{out}$ is the intensity of the light propagating along the waveguide 1604 after passing the microring 1602. Minima 1614 and 1616 of the transmittance curve 1612 correspond to zero transmittance for light having wavelengths $\lambda_m = L/m$ and $\lambda_{m+1} = L/(m+1)$, where L is the optical length of the cavity. These wavelengths represent only two of many regularly spaced minima. Wavelengths satisfy the resonance condition above, are said to have a "strong resonance" with the microring 1602, and are evanescently coupled from the waveguide 1604 into the microring 1602. In the narrow wavelength regions surrounding the wavelengths and $\lambda_m$ and $\lambda_{m+1}$, the transmittance curve 1612 reveals a steep increase in the transmittance the farther the wavelength is away from the wavelengths $\lambda_m$ and $\lambda_{m+1}$. In other words, the strength of the resonance decreases, and the portion of the light coupled from the waveguide 1604 into the microring 1602 decreases the farther the wavelength is away from a resonant wavelength. Light with wavelengths in the regions 1618-1620 pass the microring 1602 substantially undisturbed.

Figure 17:
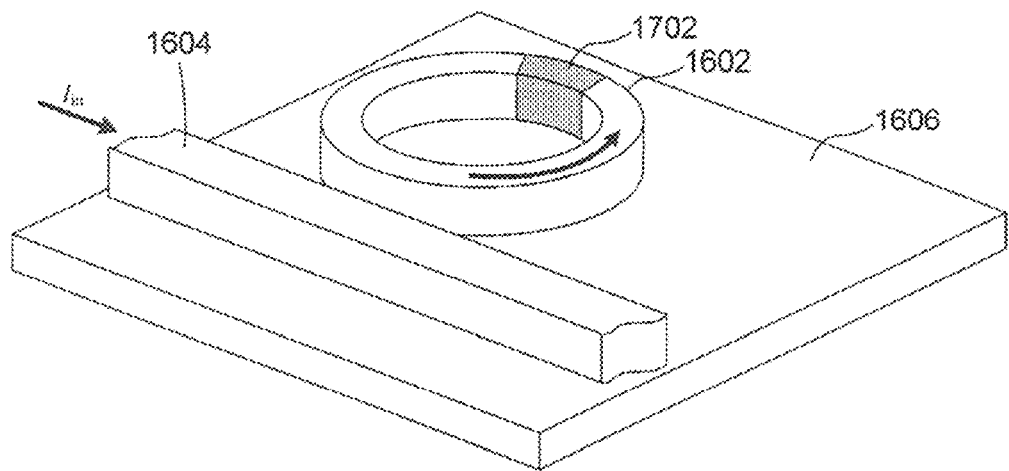
FIG. 17 shows a microring resonator coupled to a detecting resonator portion in accordance with embodiments of the present invention.

Because of the evanescent coupling properties of microring resonators, microring resonators can be operated as detecting resonators, such as detecting resonators 111-114, to detect particular wavelengths transmitting along an adjacent waveguide. FIG. 17 shows the microring resonator 1602 coupled to a detecting resonator portion 1702 in accordance with embodiments of the present invention. Light having a wavelength that is resonant with the microring 1602 is evanescently coupled from the waveguide 1604 into the microring 1602 and remains trapped for a period of time while circulating within the waveguide 1602. The detecting resonator portion 1702 can be a SiGe doped region of the microring 1602. The detecting resonator portion 1702 absorbs the light circulating in the microring 1602 and converts the light into an electronic signal that can be transmitted over signal lines to an electronically coupled node. In other embodiments, the light trapped within the microring 1602 can be evanescently coupled in a second waveguide and carried to a detector.

Figure 18:
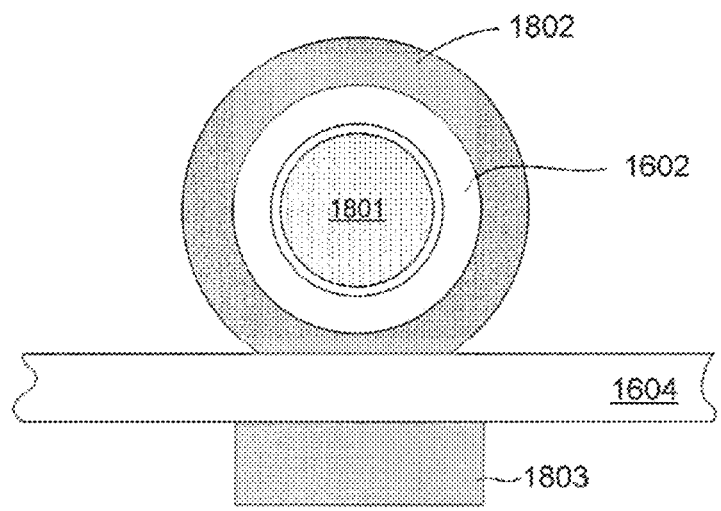
FIG. 18 shows a schematic representation and top view of doped regions surrounding the microring and the ridge waveguide in accordance with embodiments of the present invention.

The microring 1602 can be electronically tuned by doping regions of the substrate 1606 surrounding the microring 1602 and waveguide 1604 with appropriate electron donor and electron acceptor atoms or impurities. FIG. 18 shows a schematic representation and top view of doped regions surrounding the microring 1602 and the ridge waveguide 1604 in accordance with embodiments of the present invention. In certain embodiments, the microring 1602 comprises an intrinsic semiconductor. A p-type semiconductor region 1801 can be formed in the semiconductor substrate interior of the microring 1702, and n-type semiconductor regions 1802 and 1803 can be formed in the semiconductor substrate 1606 surrounding the outside of the microring 1602 and on the opposite side of the waveguide 1604. The p-type region 1801 and the n-type regions 1802 and 1803 form a p-i-n junction around the microring 1602. In other embodiments, the dopants can be reversed in order to form an n-type semiconductor region 1801 in substrate interior of the microring 1602 and p-type semiconductor regions 1802 and 1803 in the substrate surrounding the outside of the microring 1602.

The electronically tunable microring 1602 can be configured to evanescently couple or divert light from an adjacent waveguide when an appropriate voltage is applied to the region surrounding the microring. For example, the electronic controlled microring 1602 can be configured with a circumference. C and an effective refractive index $n_{eff}'$ such that light with a wavelength λ propagating along the waveguide 1604 does not satisfy the resonance condition as follows:

$$n'_{eff}C \neq m\lambda$$

where $n'_{eff}C$ is the optical length of the resonator. The passes the microring 1602 undisturbed and the microring 1602 is said to be "inactive." On the other hand, the microring 1602 can be formed with suitable materials so that when an appropriate voltage is applied to the microring 1602, the effective refractive index $n_{eff}'$ shifts to the refractive value $n_{eff}$ and the light satisfies the resonance condition:

$$n_{eff}C = m\lambda$$

The light is now coupled from the waveguide 1604 into the microring 1602 and the microring 1602 is said to be "active." When the voltage is subsequently turn "off," the effective refractive index of the microring 1602 shifts back to $n_{eff}'$ and the light propagates along the waveguide 1604 undisturbed.

Note that system embodiments of the present invention are not limited to microring resonators and ridge waveguides. In other embodiments, any suitable resonator that can be configured to couple with a particular wavelength of light propagating along a waveguide can be used.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optical arbitration system comprising:
   a waveguide having a first end and a second end;
   a source optically coupled to the first end of the waveguide to input at least one wavelength of light into the waveguide;
   wavelength selective elements optically coupled to the waveguide, wherein each wavelength selective element is coupled to a node and is capable of extracting and detecting a wavelength of light carried by the waveguide; and
   an arbiter optically coupled to the second end of the waveguide and optically coupled to the waveguide between the source and a wavelength selective element located closest to the source along the waveguide, wherein the arbiter includes
      a detection element to detect at least one wavelength of the light input in the waveguide from the source; and
      a filter disposed between the source and the wavelength selective element located closest to the source along the waveguide, and
      the arbiter comprises an electronic circuit electronically coupled to the detection element and the filter, wherein the electronic circuit receives an electronic signal from the detection element and in response to the electronic signal activates the filter to remove the at least one wavelength from the light input to the waveguide from the source.

2. The system of claim 1 wherein the wavelength selective elements include resonators.

3. The system of claim 1 wherein the waveguide is a ridge waveguide.

4. The system of claim 1, wherein the detection element further comprises a detecting wavelength selective element optically coupled to the waveguide and electronically coupled to the electronic circuit, the detecting wavelength selective element to detect the at least one wavelength of the light input to the waveguide from the source and send the electronic signal to the electronic circuit.

5. The system of claim 1, wherein the filter further comprises a disabling wavelength selective element optically coupled to the waveguide and electronically coupled to the electronic circuit between the source and the wavelength selective element, wherein the at least one disabling wavelength selective element is capable of extracting a wavelength of light from the waveguide when activated.

6. An optical arbitration system comprising:
   a waveguide having a first end and a second end;
   a source optically coupled to the first end of the waveguide to input at least one wavelength of light into the waveguide;
   wavelength selective elements optically coupled to the waveguide, wherein each wavelength selective element is coupled to a node and is capable of extracting and detecting a wavelength of light carried by the waveguide;
   an arbiter optically coupled to the second end of the waveguide and optically coupled to the waveguide between the source and a wavelength selective element located closest to the source along the waveguide, wherein the arbiter further comprises:
      a detection element disposed near the second end of the waveguide and to detect at least one wavelength of the light reaching the second end of the waveguide;
      a filter disposed between the source and the wavelength selective element located
   an electronic circuit electronically coupled to the detection element and the filter, closest to the source along the waveguide; and wherein the electronic circuit receives electronic signals from the detection element and in response to the electronic signals activates the filter to selectively remove a wavelength from the at least one wavelengths output from the source.

7. The system of claim 6 wherein the detection element further comprises at least one detecting wavelength selective element optically coupled to the waveguide near the second end of the waveguide and electronically coupled to the electronic circuit, the at least one detecting wavelength selective element to detect the at least one of the wavelengths of light input to the waveguide and send an electronic signal to the electronic circuit.

8. The system of claim 6 wherein the filter further comprises at least one disabling wavelength selective element optically coupled to the waveguide and electronically coupled to the electronic circuit between the source and the wavelength selective element located closest to the source along the waveguide, wherein the at least one disabling wavelength selective element is capable of extracting at least one of the wavelengths of light when activated.

9. An optical system comprising:
   a source optically coupled to a first end of a waveguide to input wavelengths of light into the waveguide;
   a wavelength selective element optically coupled to the waveguide, wherein the wavelength selective element is capable of extracting and detecting a wavelength of the light in the waveguide; and
   an arbiter optically coupled to a second end of the waveguide between the source and the wavelength selective element, wherein the arbiter includes
      a detection element to detect at least one wavelength of the light input in the waveguide from the source; and
      a filter disposed between the source and the wavelength selective element, and
      the arbiter comprises an electronic circuit electronically coupled to the detection element and the filter, wherein the electronic circuit receives an electronic signal from the detection element and in response to the electronic signal activates the filter to remove the at least one wavelength from the light input to the waveguide from the source.

10. The system of claim 9 wherein the wavelength selective element includes a resonator.

11. The system of claim 9, wherein the waveguide is a ridge waveguide.

12. The system of claim 9, wherein the detection element further comprises a detecting wavelength selective element optically coupled to the waveguide and electronically coupled to the electronic circuit, the detecting wavelength selective element to detect the at least one wavelength of the light input to the waveguide from the source and send the electronic signal to the electronic circuit.

13. The system of claim 9, wherein the filter further comprises a disabling wavelength selective element optically coupled to the waveguide and electronically coupled to the electronic circuit between the source and the wavelength selective element, wherein the at least one disabling wavelength selective element is capable of extracting a wavelength of light from the waveguide when activated.

* * * * *